US010452945B2

United States Patent
Hiraga et al.

(10) Patent No.: US 10,452,945 B2
(45) Date of Patent: Oct. 22, 2019

(54) IMAGE GENERATING DEVICE, ELECTRONIC DEVICE, IMAGE GENERATING METHOD AND RECORDING MEDIUM

(71) Applicant: Morpho, Inc., Tokyo (JP)

(72) Inventors: Masaki Hiraga, Tokyo (JP); Shun Hirai, Tokyo (JP); Shogo Sawai, Tokyo (JP); Ryo Ono, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 15/663,822

(22) Filed: Jul. 31, 2017

(65) Prior Publication Data

US 2017/0330052 A1   Nov. 16, 2017

Related U.S. Application Data

(62) Division of application No. 14/979,598, filed on Dec. 28, 2015, now Pat. No. 9,754,179.

(30) Foreign Application Priority Data

Dec. 26, 2014   (JP) ................. 2014-265047

(51) Int. Cl.
   *G06K 9/46*   (2006.01)
   *G06T 3/40*   (2006.01)
   *G06K 9/32*   (2006.01)

(52) U.S. Cl.
   CPC ......... *G06K 9/4604* (2013.01); *G06K 9/3216* (2013.01); *G06T 3/4038* (2013.01)

(58) Field of Classification Search
   CPC .................................................. G06K 9/342
   See application file for complete search history.

(56) References Cited

U.S. PATENT DOCUMENTS 6,075,905 A * 6/2000 Herman ............... G06K 9/32
                                                           348/588
2014/0002488 A1 * 1/2014 Summa ............... G06T 11/60
                                                           345/629

(Continued)

FOREIGN PATENT DOCUMENTS

CN       102685365       9/2012
WO       2014178235      11/2014

OTHER PUBLICATIONS

"Office Action of China Counterpart Application," dated May 3, 2018, p. 1-p. 9.

(Continued)

*Primary Examiner* — David F Dunphy
(74) *Attorney, Agent, or Firm* — JCIPRNET

(57) ABSTRACT

The present disclosure can obtain a high-quality composite image by determining a suitable boundary when input images are sequentially stitched together to generate the composite image. An image generating apparatus 1 generates a composite image by stitching sequentially input images together. A difference value calculating section 15 calculates difference values by using the pixel values of a reference image and the pixel values of a target image that partly overlap the reference image. The difference values represent the relative relationship between the reference image and the target image. A boundary determining section 16 determines a boundary for stitching the reference image and the target image together by using the difference values calculated by the difference value calculating section 15. Then, an image compositing section 18 generates the composite image by stitching the reference image and the target image together based on the boundary determined by the boundary determining section 16.

5 Claims, 26 Drawing Sheets

(56) References Cited

U.S. PATENT DOCUMENTS

2015/0154776 A1* 6/2015 Zhang .................. G06T 11/60
                                                          382/284
2016/0063705 A1* 3/2016 Xu ........................ G06T 5/50
                                                          382/199

OTHER PUBLICATIONS

Iiyoshi Takeaki, et al. "Image Lab: Image Mosaicing Method for Creating Panorama Image," Japan Industrial Publishing Co., Ltd., Jun. 10, 2008, pp. 1-12.
"Office Action of Japan Counterpart Application," dated Jul. 10, 2018, p. 1-p. 4.

* cited by examiner

IMAGE GENERATING DEVICE, ELECTRONIC DEVICE, IMAGE GENERATING METHOD AND RECORDING MEDIUM

CROSS-REFERENCE TO RELATED APPLICATION

This application is a divisional application of and claims the priority benefit of U.S. patent application Ser. No. 14/979,598 filed on Dec. 28, 2015, now pending, which claims the priority benefit of Japan application no. 2014-265047, filed on Dec. 26, 2014. The entirety of each of the above-mentioned patent applications is hereby incorporated by reference herein and made a part of this specification.

TECHNICAL FIELD

The present disclosure relates to an image generating device that generates a wide-angle composite image.

BACKGROUND ART

Image generating devices that stitch sequentially input images to generate a panoramic image, which is a single wide-angle composite image, have been known in the art (e.g. see Patent Document 1).

CITATION LIST

Patent Literature

Patent Document 1: JP H11-73492A

SUMMARY

Technical Problem

Conventional image generating devices as disclosed in Patent Document 1 generate a single wide-angle composite image by receiving sequentially-input photographed images and aligning and stitching together the input images. However, a problem with such conventional image generating devices is that it is difficult to seamlessly stitch a plurality of input images together without leaving any trace of a stitching boundary thereon.

Further, such conventional image generating devices do not always successfully perform alignment such that a boundary is not formed on (over) the area of a subject to be photographed (hereinafter referred to as a "target subject"). Accordingly, a problem is that when images are aligned such that a boundary is formed on the area of a target subject, there may be a defect in the image area of the target subject in the resultant composite image. For example, the target subject may be partially duplicated or missing.

The present disclosure was made in view of the problem, and the present disclosure can obtain a high-quality composite image by determining a suitable boundary when input images are sequentially stitched together to generate the composite image.

Solution to Problem

In order to solve the above-described problem, the following means are employed. The reference signs used in the following description of embodiments and drawings are added for the purpose of reference. However, the components of the present disclosure are not limited to those represented by the reference signs.

A first disclosure is an image generating device (image generating device 1) that stitches sequentially input images together to generate a composite image, including: a relative value calculating unit (difference value calculating section 15) configured to calculate relative values (difference values of pixel values or ratios of pixel values) from pixel values of a first input image (reference image) and pixel values of a second input image (target image) that partly overlaps the first input image, in which the relative values represent relative relationship between the first input image and the second input image; a boundary determining unit (boundary determining section 16) configured to determine a boundary for stitching the first input image and the second input image together by using the relative values calculated by the relative value calculating unit; and an image compositing unit (image compositing section 18) configured to stitch the first input image and the second input image together based on the boundary determined by the boundary determining unit so as to generate the composite image.

Another disclosure may be an image generating method for generating a composite image by stitching together sequentially input images, including the steps of: calculating relative values (difference values of pixel values or ratios of pixel values) from pixel values of a first input image (reference image) and pixel values of a second input image (target image) that partly overlaps the first input image, in which the relative values represent relative relationship between the first input image and the second input image; determining a boundary for stitching the first input image and the second input image together by using the calculated relative values; and stitching the first input image and the second input image together based on the determined boundary so as to generate the composite image.

Yet another disclosure may be a non-transitory readable recording medium storing a program (image generating program 811) for stitching sequentially input images together to generate a composite image, in which the program makes a computer execute the steps of: a relative value calculating step (A5 of the image generation processing) of calculating relative values (difference values of pixel values or ratios of pixel values) from pixel values of a first input image (reference image) and pixel values of a second input image (target image) that partly overlaps the first input image, in which the relative values represent relative relationship between the first input image and the second input image; a boundary determining step (A11 of the image generation processing) of determining a boundary for stitching the first input image and the second input image together by using the calculated relative values; and an image compositing step (A21 of the image generation processing) of stitching the first input image and the second input image together based on the determined boundary so as to generate the composite image.

By means of the first disclosure and the like, a change in the relative positional relationship of a background and a subject between the first input image and the second input image can be determined from the relative values that represent the relative relationship between the first input image and the second input image. Accordingly, by using the relative values, it becomes possible to determine the boundary for stitching the first input image and the second input image together at a suitable position. As a result, a high-quality composite image can be obtained by the image composition.

A second disclosure may be the image generating device according to the first disclosure, wherein the boundary determining unit determines the boundary by performing predetermined separation processing (face detection processing, minimum cost pixel set search processing, graph cut processing) on a relative value image (difference image, ratio image) that is composed of the relative values calculated by the relative value calculating unit as pixel values, so as to separate the relative value image into a target subject area, which is an image area of a target subject, and a non-target subject area, which is the other image area in the relative value image.

By means of the second disclosure, the separation processing is performed to separate the relative value image into the target subject area and the non-target subject area. Accordingly, the target subject area can be separated from the non-target subject area in order to determine the boundary for stitching the first input image and the second input image together. As a result, the composite image thus generated by the image composition becomes a high-quality image with no discordance (caused by misalignment) in the target subject area.

Another disclosure may be the image generating device according to the second disclosure, wherein the separation processing includes target subject detection processing (face detection processing, etc.) to detect the target subject from among at least one of the first and second input images, and the boundary determining unit determines the boundary by using the relative value image and a processing result of the target subject detection processing.

By means of the disclosure, the target subject is detected from the input images, and the boundary is determined by using the relative value image and the result of the target subject detection. This enables the prevention of the formation of the boundary on the target subject area, and it is therefore possible to generate a high-quality composite image with no discordance in the target subject area.

A third disclosure may be the image generating device according to the second disclosure, wherein the boundary determining unit determines the boundary by performing pixel set search processing (minimum cost pixel set search processing) as the separation processing to search the relative value image (difference image) for a pixel set that meets a predetermined separation condition of an evaluation value (total cost value) for separating the target subject area from the non-target subject area, in which the pixel set is composed of a series of pixels from a pixel at a starting point of the boundary (starting pixel) to a pixel at an end point of the boundary (end pixel), and the evaluation value is calculated based on relative values of the series of pixels.

By means of the third disclosure, the boundary for stitching the first input image and the second input image together at a suitable position can be readily and suitably determined by the pixel set search processing.

A fourth disclosure may be the image generating device according to the second or third disclosure, wherein the boundary determining unit determines the boundary by performing the separation processing under a restraint condition that restricts the boundary from being formed on a predetermined boundary restraint area (area of a predetermined object) in the relative value image.

By means of the fourth disclosure, a restriction can be imposed so that the predetermined boundary restraint area of the relative value image is avoided when determining the boundary. Accordingly, when the image area of the target subject is set as the boundary restraint area, for example, the boundary can be formed in the area outside the target subject.

The fifth disclosure may be the image generating device according to the fourth disclosure, further including: a pixel value correcting unit (processing section of the image generating device 1) configured to change pixel values of pixels in the boundary restraint area in the relative value image to a predetermined pixel value that is based on the restraint condition (a value higher than the maximum value among the difference values of the pixels outside the boundary restraint area; e.g. the maximum grayscale value), wherein the boundary determining unit determines the boundary by performing the separation processing on the relative value image with the corrected pixel value changed by the pixel value correcting unit.

By means of the fifth disclosure, the pixel values of the pixels of the boundary restraint area in the relative value image are changed to the predetermined pixel value based on the restraint condition, and then the separation processing is performed. Accordingly, the boundary restraint area is more reliably avoided when determining the boundary.

A sixth disclosure may be the image generating device according to the fourth or fifth disclosure, further including: a face detecting unit (processing section of the image generating device 1) configured to detect a face from at least one of the first and second input images, wherein the boundary determining unit determines the boundary by performing the separation processing under the restraint condition in which an area in the relative value image that corresponds to the face detected by the face detecting unit is set as the boundary restraint area.

By means of the sixth disclosure, the face is avoided when determining the boundary. As a result, the boundary is not formed on the face, which can prevent the resultant composite image from having a discordance in the face area.

A seventh disclosure may be the image generating device according to any one of the fourth to sixth disclosures, wherein the boundary determining unit includes a boundary re-determining unit (boundary determining section 16) configured to re-determine the boundary under a restraint condition different from the original restraint condition, and the image compositing unit includes an image re-compositing unit (image compositing section 18) configured to stitch the first input image and the second input image together based on the boundary re-determined by the boundary re-determining unit, so as to regenerate the composite image.

By means of the seventh disclosure, when the original boundary is not suitable, the boundary can be re-determined under a different restraint condition to form a boundary different from the original boundary, so that the composite image can be regenerated.

An eighth disclosure may be the image generating device according to any one of the first to seventh disclosures, further including: an alignment unit (alignment section 14) configured to align the second input image and the first input image with each other based on correspondence between characteristic points in the first input image and characteristic points in the second input image, wherein the image compositing unit stitches the first input image and the second input image together based on an alignment result obtained by the alignment unit and the boundary determined by the boundary determining unit.

By means of the eighth disclosure, the first input image and the second input image can be suitably stitched together by using the result of the alignment of the first input image and the second input image and the determined boundary.

A ninth disclosure may be an electronic device (smartphone 2, digital camera, tablet, PDA, personal computer, etc.), including: the image generating device (image generating device 1) according to any one of the first to eighth disclosures; a display unit (display section 300); and a display control unit (display control section 190) configured to display the composite image generated by the image compositing unit on the display unit.

By means of the ninth disclosure, the user can view the composite image on the electronic device, which is generated by the image generating device according to any one of the first to eighth disclosures.

A tenth disclosure may be the electronic device according to the ninth disclosure, wherein the display control unit overlays the boundary determined by the boundary determining unit on the composite image (FIG. 24 (2)).

By means of the tenth disclosure, the user can check the position at which the first input image and the second input image have been stitched together.

An eleventh disclosure may be an electronic device (smartphone 2, digital camera, tablet, PDA, personal computer, etc.), including: the image generating device (image generating device 1) according to any one of the fourth to seventh disclosures; an operating unit (operating section 200, touch panel 250); a display unit (display section 300); and a display control unit (display control section 190) configured to display at least one of the first and second input images on the display unit, wherein the boundary determining unit determines the boundary under the restraint condition in which a specified area (an area including a tapped spot designated by a user tap gesture) is specified in the input image displayed on the display unit according to a user operation on the operating unit, and an area in the relative value image that corresponds to the specified area is set as the boundary restraint area.

By means of the eleventh disclosure, an input image is displayed to prompt the user to specify an area where the boundary should not be formed. Accordingly, the boundary can be formed in an area outside the specified area according to the user operation.

A twelfth disclosure may be an electronic device (smartphone 2, digital camera, tablet, PDA, personal computer, etc.), including: the image generating device (image generating device 1) according to the seventh disclosure; an operating unit (operating section 200, touch panel 250); a display unit (display section 300); and a display control unit (display control section 190) configured to display the composite image generated by the image compositing unit on the display unit, wherein the display control unit overlays the boundary determined by the boundary determining unit on the composite image (FIG. 24 (2)), when the specified area specified by the user operation on the operating unit (tapped spot designated by a user tap gesture) includes the boundary, the boundary re-determining unit re-determines the boundary under the restraint condition in which an area in the relative value image that corresponds to the specified area is set as the boundary restraint area (FIG. 24 (5)), and the display control unit displays the composite image regenerated by the image re-compositing unit on the display unit (FIG. 24 (6)).

By means of the twelfth disclosure, the boundary is overlaid on the composite image, so that the user can check the position at which the first input image and the second input image are stitched together. Then, when the displayed composite image is not desirable, the user can specify a part of the boundary so that the boundary is re-determined, and he/she then can check the regenerated composite image based on the re-determined boundary.

A thirteenth disclosure may be the electronic device according to the tenth or twelfth disclosure, wherein the display control unit displays the boundary on the display unit in a manner distinguishable from the composite image (displayed in a particular color, displayed as a bold line, or displayed in a blinking manner).

By means of the thirteenth disclosure, the user can readily find the boundary overlaid on the composite image.

A fourteenth disclosure may be an electronic device (smartphone 2, digital camera, tablet, PDA, personal computer, etc.), including: the image generating device (image generating device 1) according to any one of the first to eighth disclosures; a display unit (display section 300); an imaging unit (imaging section 500); a display control unit (display control section 190) configured to display a standby imaging screen on the display unit, in which the standby imaging screen is a screen in a standby state for the imaging unit for photographing a subject; a face detecting unit (processing section 100) configured to detect a face from an image shown in the standby imaging screen; and a notifying unit (display section 300, sound output section 400) configured to give a predetermined caution when the face detected by the face detecting unit is included in a predetermined marginal area of the standby imaging screen, wherein the image generating device generates the composite image by using photographed images captured by the imaging unit as the first and second input images.

By means of the fourteenth disclosure, a predetermined caution is given when a face is shown in the margin of the standby imaging screen. Accordingly, the user can be prompted to take a suitable image before he/she takes it.

A fifteenth disclosure may be the electronic device according to the fourteenth disclosure, wherein the notifying unit gives as the caution any one of (1) a notification that prompts the user to adjust a position of the electronic device or a position of the face so that the face is away from a margin of the screen, (2) a notification that prompts the user to move the face toward a center of the screen and (3) a notification that prompts the user to take at least one image in which the face is not located in the margin of the screen.

By means of the fifteenth disclosure, before the user takes images, it becomes possible to prompt the user to move the device or to adjust the position of the face so that the face is away from the screen margin, to prompt the user to move the face to the center of the screen or to prompt the user to take at least one image in which the face is not located in a margin of the image. As a result, it is possible to reliably prevent the boundary from being formed on the face.

DESCRIPTION OF EMBODIMENTS

Hereinafter, a preferred embodiment of the present disclosure will be described with reference to the drawings. In the following description, the same reference signs denote the same components, and repeated descriptions may be omitted. The drawings do not necessarily correspond to the description with respect to their dimensions. It should be understood that the embodiments of the present disclosure are not limited to the following embodiment.

1. Image Generating Device

An image generating device according to the embodiment stitches sequentially-input images together every time an image is input, so as to generate a single composite image. For example, the image generating device is suitably used for stitching a plurality of images captured by continuous shooting together in real time to generate a panoramic image that is wider than a single photographed image.

For example, the image generating device according to the embodiment can be installed in mobile terminals that have limited resources such as cell-phones or smartphones, digital cameras, tablets and PDAs (personal digital assistants). However, such devices are not limited thereto, and it can also be installed in, for example, general computer systems.

1-1. Configuration and Principle

Figure 1:
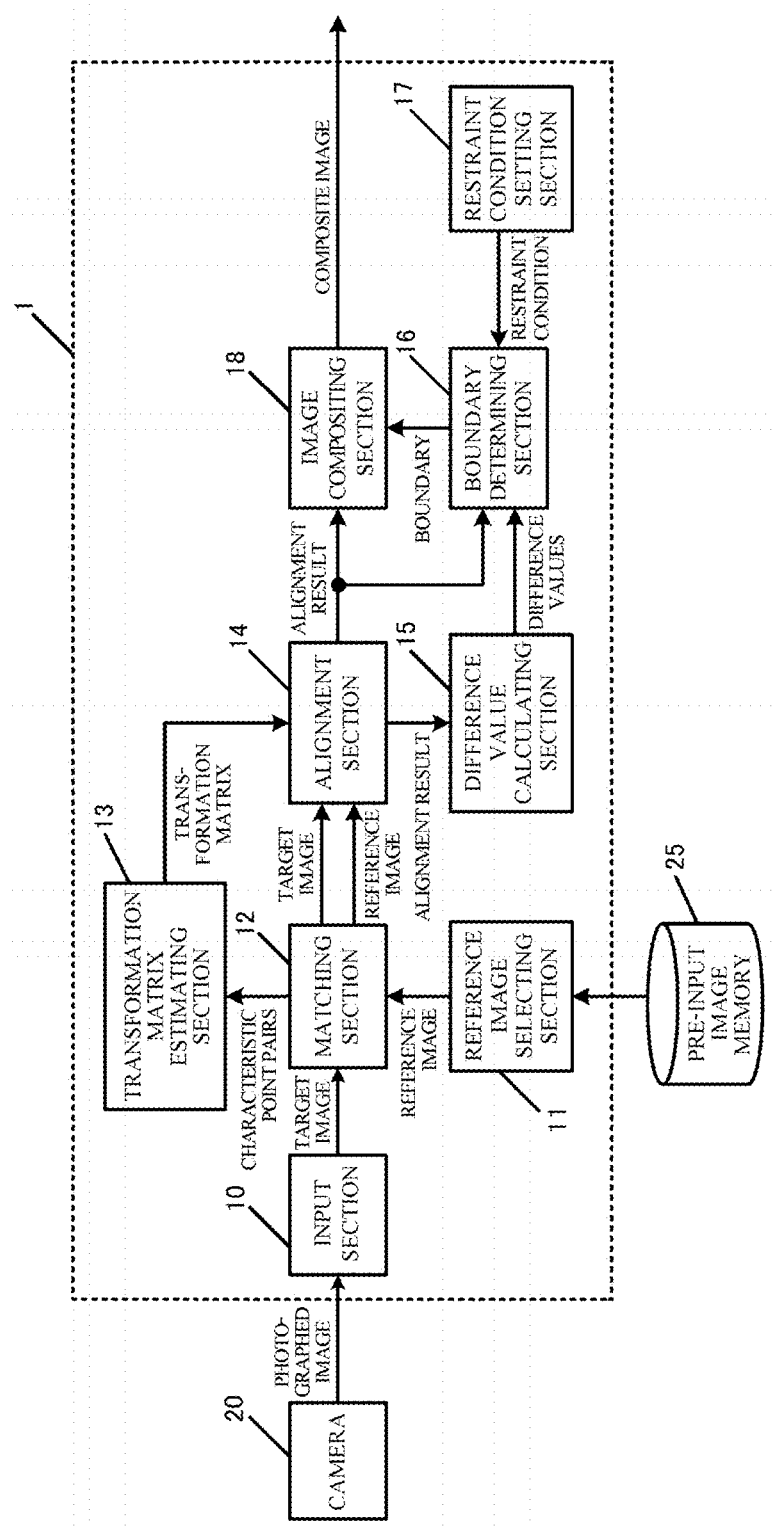
FIG. 1 is a block diagram of an example of the functional configuration of an image generating device.

FIG. 1 is a block diagram illustrating an example of the functional configuration of the image generating device 1 according to the embodiment.

The image generating device 1 includes an input section 10, a reference image selecting section 11, a matching section 12, a transformation matrix estimating section 13, an alignment section 14, a difference value calculating section 15, a boundary determining section 16, a restraint condition setting section 17 and an image compositing section 18. These sections are functional sections (functional blocks) of a processing unit (processing device) of the image generating device 1, and the processing unit includes a processor such as a CPU and a DSP, an integrated circuit such as an ASIC, and the like.

Figure 2:
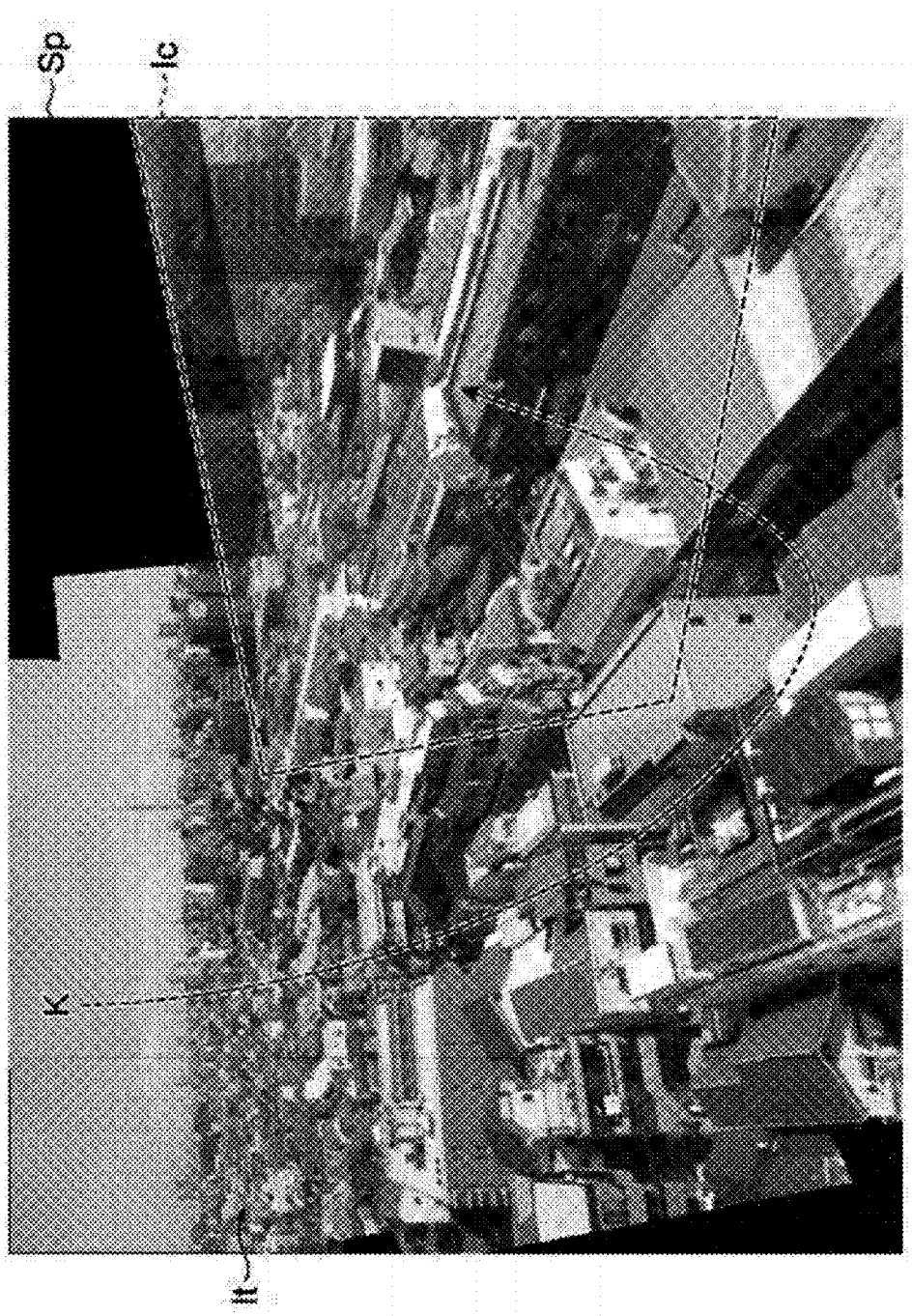
FIG. 2 is a schematic view illustrating a wide-angle panoramic composite image.

The image processing device 1 has a function of sequentially merging the obtained images to generate a panoramic composite image of a wide angle. For example, when an imaging direction of the camera 20 is changed as indicated by an arrow K as illustrated in FIG. 2, sequentially input images are merged to sequentially draw a composite image on a composition plane Sp. For example, when a currently input image is Ic, the image Ic is merged with a current composite image It and one composite image is generated.

The input section 10 has a function of inputting an image captured by a camera 20 (hereinafter referred to as a "photographed image"). For example, the input section 10 has a function of inputting a photographed image every time the image is captured.

The input section 10 stores a first input image in a first temporary storage area (hereinafter referred to as an "output image buffer"). Further, the input section 10 stores the subsequent sequentially input images in a second temporary storage area (hereinafter referred to as an "input image buffer").

When an image is stored in the second temporary storage area, alignment of the image is carried out, and a determination is made as to whether the image is to be rendered. When it is determined that the image is to be rendered, the output image stored in the first temporary storage area is updated by image composition, and the updated image is overwritten. In the following description, the image stored in the first temporary storage area is referred to as a composite image It, and the image stored in the second temporary storage area is referred to as a target image Ic (input image).

The reference image selecting section 11 has a function of selecting a reference image Ir for alignment. The reference image Ir is used as a reference for aligning the target image Ic. For example, the reference image selecting section 11 can reference a pre-input image memory 25 in which information on a pre-input image is stored. The pre-input image(s) refers to one or more images that were input by the input section 10 before the target image Ic. That is, when the n-th target image Ic is referred to as Ic (n−1), the pre-input images are referred to as Ic (n−2), Ic (n−3) . . . Ic0. When there is one pre-input image, the reference image selecting section 11 selects the image Ic1 as a reference image Ir0 for a target image Ic2. After this, the reference image selecting section 11 does not change the reference image unless a predetermined condition is met.

For example, the predetermined condition may be set such that the distance from the reference image Ir to the target image Ic (n) is equal to or greater than a predetermined value. When the condition is met, the reference image selecting section 11 selects the target image Ic (n) as a reference image Ir (k) for the next new target image Ic (n+1) and stores information on the target image Ic (n) in the pre-input image memory 25. The information on the target image Ic (n) may be composed of, for example, only the pixel values and the positional information of characteristic points obtained by the matching section 12 (described below). Limiting the information to be recorded in the pre-input image memory 25 enables memory usage to be reduced in comparison to when storing the reference image itself.

When a target image Ic (n+1) is input, the reference image selecting section 11 references the pre-input image memory 25 and selects the target image Ic (n) as the reference image Ir (k). In this way, the reference image selecting section 11 selects one reference image Ir for each target image Ic.

Alternatively, when the predetermined condition is met, the reference image selecting section 11 may select a temporary reference image for the target image Ic (n). The temporary reference image is temporarily selected from the pre-input image. The details of temporary reference image selection processing will be described below.

The reference image selecting section 11 outputs the image information on the reference image Ir (at least including pixel information and positional information of characteristic points) to the matching section 12.

The matching section 12 acquires the corresponding relationship between the reference image Ir and the target image Ic. The matching section 12 acquires information on characteristic points in the reference image Ir and characteristic points in the target image Ic. The matching section 12 acquires the corresponding relationship between the reference image Ir and the target image Ic, for example, based on the pixel values of the characteristic points. The matching may be carried out by a method known in the art such as block matching and a gradient method.

The matching section 12 may convert the reference image Ir and the target image Ic to respective multiresolution images before the matching. For example, the matching section 12 gradually changes the resolution of the reference image Ir and the target image Ic to generate a respective plurality of images with different resolutions. Then, the matching section 12 gets the amount of parallel shift of the characteristic points between images with the lowest resolution, and carries out the pixel-level matching of the characteristic points between images with a higher resolution. In this case, an improvement in processing speed and a reduction in computing cost can be achieved.

The matching section 12 obtains positional information (coordinate information) of pairs of characteristic points for which the corresponding relationship between the reference image Ir and the target image Ic has been calculated. That is, the matching section 12 obtains the positional information of a certain characteristic point in the reference image Ir and the positional information of the corresponding characteristic point in the target image Ic as a pair. The matching section 12 obtains information on multiple pairs of characteristic points for the alignment processing (described below).

The matching section 12 outputs the obtained pairs of characteristic points to the transformation matrix estimating section 13. As described above, when the reference image selecting section 11 adds the target image Ic as the reference image Ir for the subsequent images, the matching section 12 outputs the pixel values and positional information of the characteristic points in the target image Ic to the reference image selecting section 11.

The transformation matrix estimating section 13 estimates a transformation matrix based on the corresponding relationship between the reference image Ir and the target image Ic output from the matching section 12. The transformation matrix associates the coordinate system of the reference image Ir with the coordinate system of the target image Ic.

The alignment section 14 carries out alignment of the reference image Ir and the target image by using the transformation matrix estimated by the transformation matrix estimating section 13.

Figure 4:
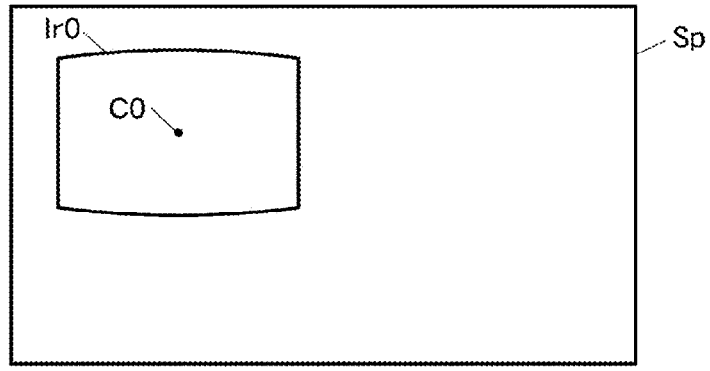
FIG. 4 (1) to FIG. 4 (3) are schematic views illustrating the alignment of a reference image and a target image.
Figure 4:
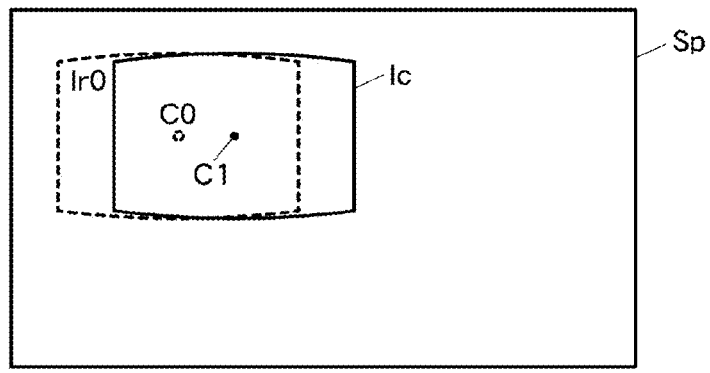
Figure 4:
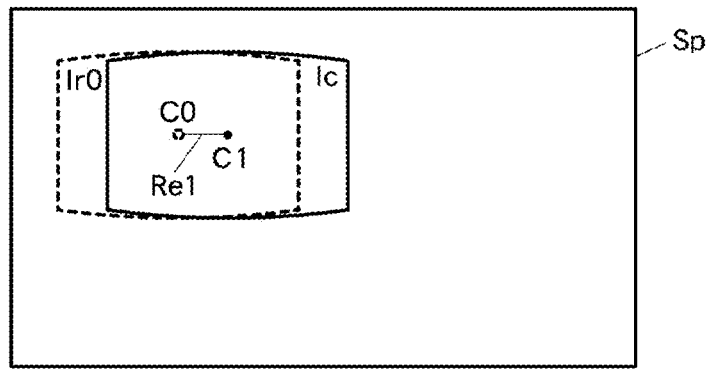

FIG. 4 (1) to FIG. 4 (3) are schematic views illustrating the alignment of the reference image Ir and the target image Ic.

As illustrated in FIG. 4 (1), when only the first image is input, the input first image is selected as a reference image Ir0. Then, when the second image (target image Ic) is input, the alignment section 14 carries out alignment of the target image Ic with reference to the position of the reference image Ir0.

As used herein, the alignment means to determine the position of a predetermined point (the center C1 in the illustrated example) of the target image Ic relative to a predetermined point (the center C0) of the reference image Ir0 as illustrated in FIG. 4 (2). The alignment section 14 searches for the position where the pairs of characteristic points obtained by the matching section 12 overlap each other at the largest amount. Then, as illustrated in FIG. 4 (3), when the alignment of the reference image Ir0 and the target image Ic is complete, it is recorded that the positional relationships of each have been linked together (link Re 1).

As described above, when the relative distance from the reference image Ir0 to the target image Ic is equal to or greater than a predetermined value after the alignment section 14 finishes the alignment, it is required that the reference image selecting section 11 adds the target image Ic as the reference image Ir1 for the subsequent images. Accordingly, the matching section 12 outputs the pixel values and the positional information of characteristic points in the target image Ic to the reference image selecting section 11.

Figure 5A:
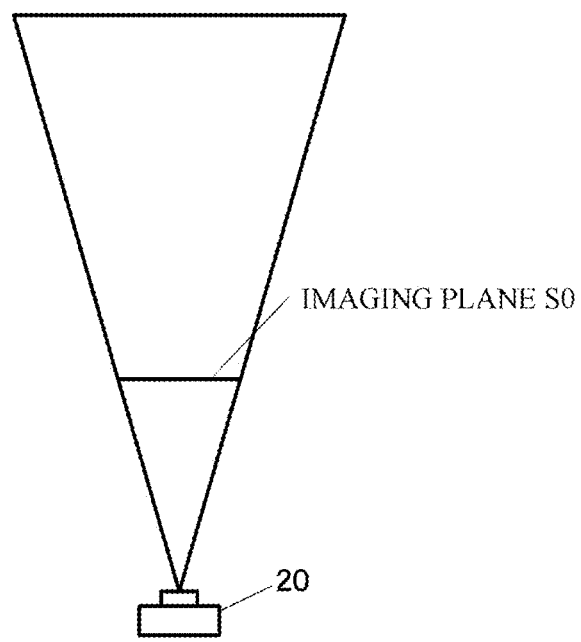
FIG. 5 (A) and FIG. 5 (B) are schematic views illustrating deformation in compositing a target image in relation to camera rotation.
Figure 5B:
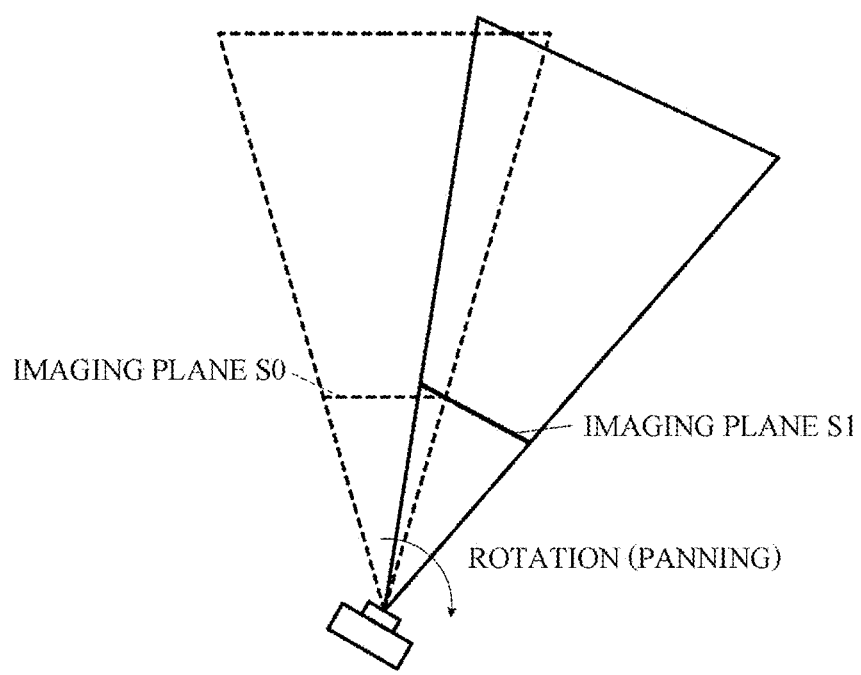

FIG. 5 (A) and FIG. 5 (B) are schematic views illustrating an imaging plane and rotation (panning) of the camera 20.

As illustrated in FIG. 5 (A) and FIG. 5 (B), the imaging plane of the camera 20 before rotation, which is referred to as the imaging plane S0, and the imaging plane of the camera 20 after the rotation, which is referred to as an imaging plane S1, are not located in the same plane. For this reason, the aligned position that is obtained by a parallel shift of the characteristic points deviates from the correct aligned position. That is, in consideration of such camera movement, it is necessary to carry out the alignment such that the positions of the characteristic points in the reference image Ir coincide with the positions of the characteristic points in the target image Ic in the same three-dimensional coordinate system.

For this reason, the transformation matrix estimating section 13 estimates a transformation matrix that conforms the three-dimensional coordinate system of the target image Ic with the three-dimensional coordinate system of the reference image Ir0.

Figure 6:
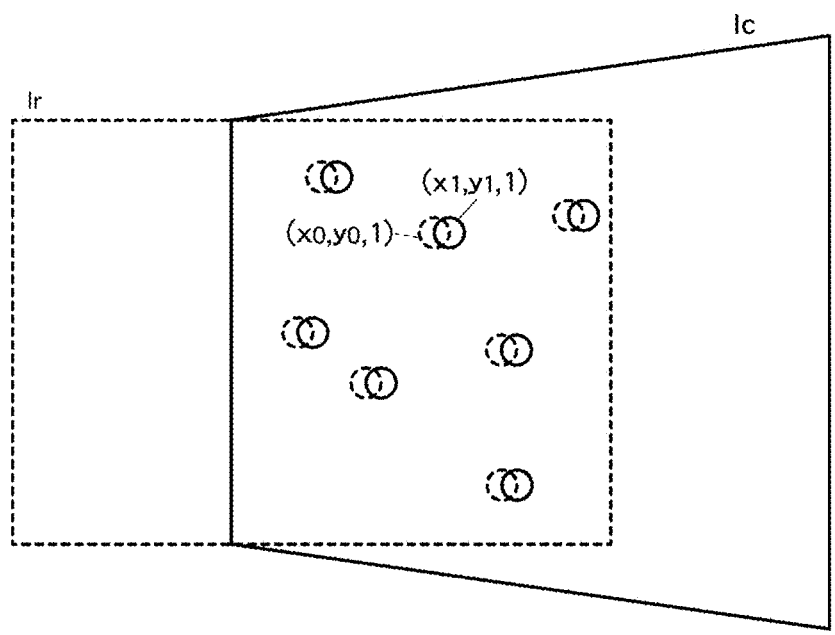
FIG. 6 is a schematic view illustrating corresponding points of a reference image and a target image.
Figure 7A:
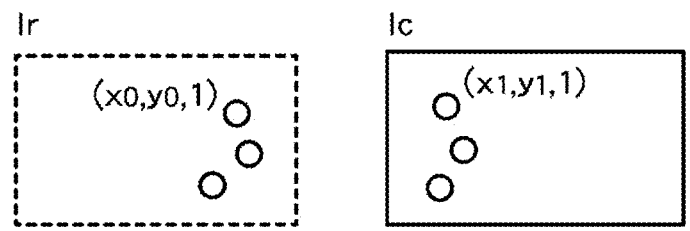
FIG. 7 (A) to FIG. 7 (C) are schematic views illustrating the details of the alignment of a reference image and a target image.
Figure 7A:
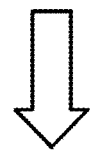
Figure 7B:
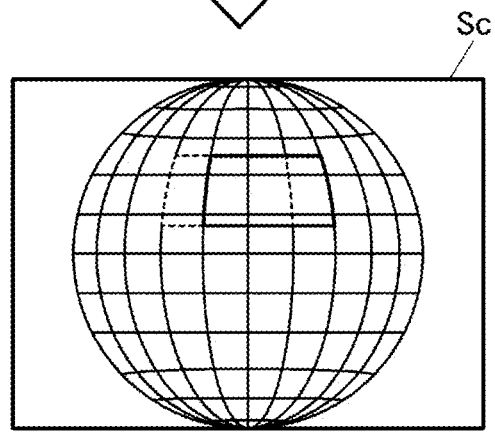
Figure 7B:
Figure 7C:
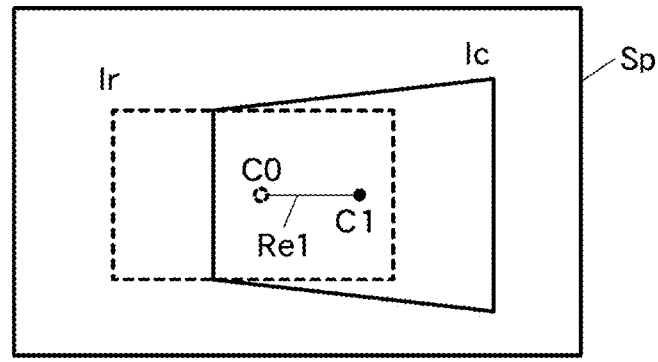

FIG. 6 illustrates the principle of generating the transformation matrix.

As illustrated in FIG. 6, when the coordinate of a characteristic point in the reference image Ir0 is (x0, y0, 1), and the coordinate of the corresponding characteristic point in the target image Ic is (x1, y1, 1), the transformation matrix estimating section 13 estimates a transformation matrix that conforms (x1, y1, 1) with (x0, y0, 1).

Regarding the degrees of freedom with respect to the camera, the camera has six degrees in total, i.e. the camera movement (parallel shift in the x and y directions, zoom in/out due to shift in z direction), and the camera panning ((trapezoidal) image distortion in the x and y directions, image rotation in the z axis). Further, rolling shutter distortion (focal plane distortion) corresponding to two degrees of freedom (shear and aspect ratio) is also taken into account so that the camera can be considered to have eight degrees of freedom. Then, the transformation matrix can be expressed by the following equation (1).

$$\begin{pmatrix} x_0 \\ y_0 \\ 1 \end{pmatrix} = \begin{pmatrix} a_1 & b_1 & c_1 \\ d_1 & e_1 & f_1 \\ g_1 & h_1 & 1 \end{pmatrix} \cdot \begin{pmatrix} x_1 \\ y_1 \\ 1 \end{pmatrix} \quad (1)$$

The parameters a1 to h1 in the transformation matrix (transformation equation) correspond to the above-described eight degrees of freedom. The transformation matrix estimating section 13 determines the transformation matrix parameters with which the equation holds for multiple pairs of characteristic points by a convergence calculation using an optimization method. Specifically, the convergence calculation is performed to minimize the value of an objective function that includes the difference between the position (x0, y0, 1) of the characteristic point in the reference image Ir and the transformed position of the position (x1, y1, 1) of the corresponding characteristic point in the target image Ic. The optimization method may be a method known in the art such as Newton's method and Gauss-Newton method.

The transformation matrix estimating section 13 has a function of reducing the parameters of the camera to three parameters by assuming that the camera 20 is only panned (rotated) between the reference image Ir and the target image and estimating the transformation equation by using the positional information of the pairs of characteristic points. For example, as illustrated in FIG. 6, when the camera 20 is located at the origin while photographing, the parameters of the camera are reduced to rotation about the x, y and z axes. The transformation matrix R can be expressed by the following equation (2), where the parameters of the respective axes are ($\beta$, $\alpha$, $\gamma$).

$$R = R_z \cdot R_x \cdot R_y = \begin{pmatrix} \cos(\gamma) & -\sin(\gamma) & 0 \\ \sin(\gamma) & \cos(\gamma) & 0 \\ 0 & 0 & 1 \end{pmatrix} \cdot \begin{pmatrix} 1 & 0 & 0 \\ 0 & \cos(\beta) & -\sin(\beta) \\ 0 & \sin(\beta) & \cos(\beta) \end{pmatrix} \cdot \begin{pmatrix} \cos(\alpha) & 0 & \sin(\alpha) \\ 0 & 1 & 0 \\ -\sin(\alpha) & 0 & \cos(\alpha) \end{pmatrix} \quad (2)$$

That is, the relation between the location (x0, y0, 1) of a characteristic point in the reference image Ir and the location (x1, y1, 1) of the corresponding characteristic point in the target image Ic can be expressed by the following equation (3) using the transformation matrix R.

$$\begin{pmatrix} x_0 - c_x \\ y_0 - c_y \\ F \end{pmatrix} \cong R \cdot \begin{pmatrix} x_1 - c_x \\ y_1 - c_y \\ F \end{pmatrix} \quad (3)$$

In the equation, ($c_x$, $c_y$) is the center coordinate of the reference image Ir or the target image Ic when their image sizes are the same. "F" is the focal length. The focal length F may be retrieved from the specification information of the camera 20.

As in equation (1), when the transformation matrix includes a reduction component and the convergence calculation prioritizes the minimization of errors, the calculated transformation matrix tends to have a large reduction component since more reduced images result in a relatively smaller error. In such cases, errors are accumulated as the images are sequentially composited, and the quality of the resultant panoramic image is not high. In contrast, when the components of the transformation matrix R are limited to rotation components as in equation (2), it becomes possible to avoid such an accumulation of errors since the reduction component is not considered in the convergence calculation by an optimization method. Accordingly, a high-quality panoramic image is generated.

In the convergence calculation using an optimization method such as the Gauss-Newton method, the transformation matrix for the last target image Ic may be used as the initial value. In this case, the speed of the convergence calculation can be improved since the matrix is likely to converge faster.

The transformation matrix estimating section 13 estimates the transformation matrix R through the above-described processing and outputs the estimated transformation matrix R to the alignment section 14.

In the embodiment, when the transformation matrix estimating section 13 estimates the transformation matrix R by the convergence calculation of equation (3), it projects the two-dimensional coordinate of a characteristic point to a sphere in a three-dimensional space Sc so as to estimate the transformation matrix R by using the corresponding relationship of the projected coordinates.

FIG. 7 (A) to FIG. 7 (C) are schematic views illustrating the details of the alignment of the reference image Ir and the target image Ic.

As illustrated in FIG. 7 (A) and FIG. 7 (B), the transformation matrix estimating section 13 perspectively projects the location (x0, y0, 1) of a characteristic point in the reference image Ir in the two-dimensional coordinate system and the location (x1, y1, 1) of the corresponding characteristic point in the target image Ic in the two-dimensional coordinate system, to the sphere in the three-dimensional space Sc. For example, the perspective projection of a coordinate (x1, y1, F) can be expressed by the following equation (4), where (xn−cx) is the vector xn, (yn−cy) is the vector yn, and the coordinate after the projection is (Xn, Yn, Zn).

$$\begin{pmatrix} X_1 \\ Y_1 \\ Z_1 \end{pmatrix} = \frac{1}{\sqrt{\hat{x}_1^2 + \hat{y}_1^2 + F^2}} \begin{pmatrix} \hat{x}_1 \\ \hat{y}_1 \\ F \end{pmatrix} \quad (4)$$

Further, the coordinate after the transformation by the transformation matrix R can be expressed by the following equation (5).

$$\begin{pmatrix} R(X_1) \\ R(Y_1) \\ R(Z_1) \end{pmatrix} = R \cdot \begin{pmatrix} X_1 \\ Y_1 \\ Z_1 \end{pmatrix} \quad (5)$$

Accordingly, the objective function of the convergence calculation includes the difference r of the following equations (6).

$$r_x = R(X_1) - X_0$$

$$r_y = R(Y_1) - Y_0$$

$$r_z = R(Z_1) - Z_0 \quad (6)$$

The transformation by the equation (4) can be omitted with an assumption that the target image Ic is located at a close distance from the reference image Ir. In this case, the above-described difference r can be expressed without subtraction, and there is no need to consider cancellation of digits due to subtraction. Accordingly, the calculation can be simplified when the objective function is subjected to the convergence calculation by an optimization processing using the Gauss-Newton method or the like. As a result, the computing cost can be reduced when the projection to a sphere in the three-dimensional space is performed for the calculation.

The transformation matrix estimating section 13 estimates the transformation matrix R through the above-described processing. Then, by using the estimated transformation matrix R, the alignment section 14 aligns the target image Ic with the reference image Ir. To be more specific, the alignment section 14 sequentially carries out alignment of the input target image Ic with the reference image Ir that is selected by the reference image selecting section 11, so that a link Re1 is generated between the center C0 of the reference image Ir and the center C1 of the target image Ic as illustrated in FIG. 7 (C).

Figure 8:
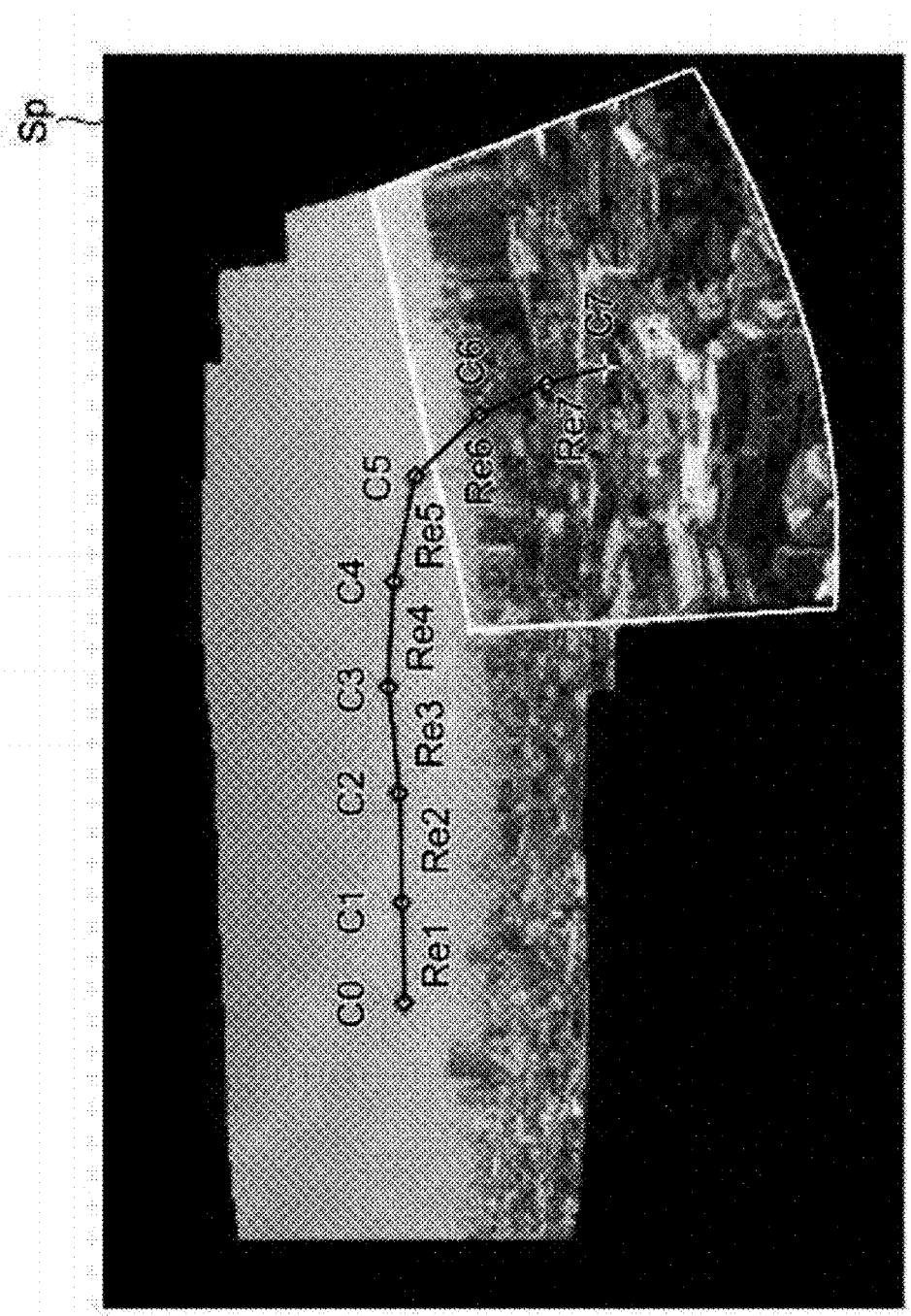
FIG. 8 is a schematic view illustrating alignment of a plurality of images.

FIG. 8 illustrates an example of links that are developed as a result of alignment between eight input images.

As illustrated in FIG. 8, the centers C0 to C7 of the eight input images are linked to each other (links Re1 to Re7). By repeating the operation in which the reference image selecting section 11 selects the reference image Ir and the alignment section 14 generates the link, images can be stitched together while being aligned as illustrated in FIG. 8.

Figure 3:
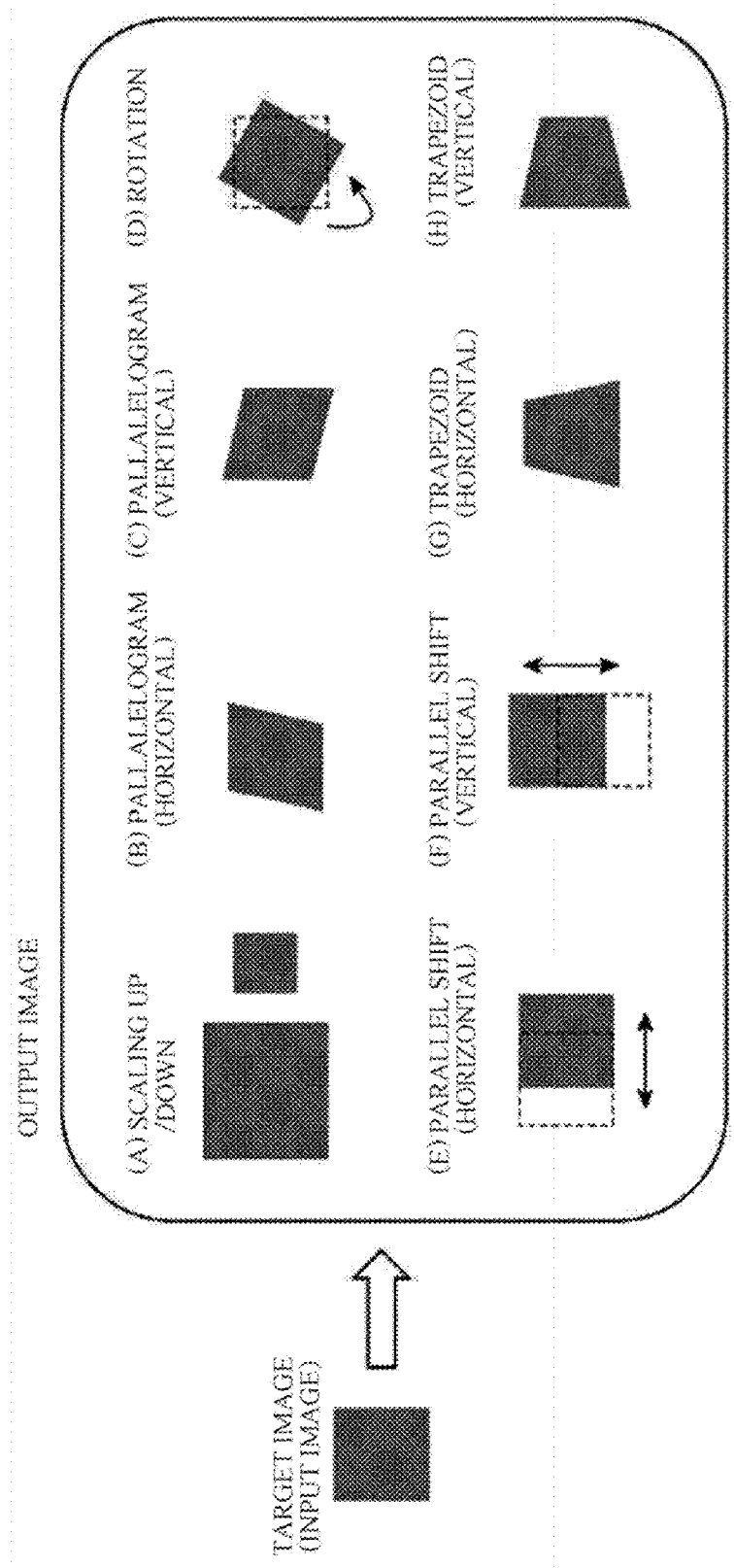
FIG. 3 a schematic view illustrating deformations in compositing a target image.

In order for the transformation matrix estimating section 13 to project a coordinate to a sphere to estimate the transformation matrix R, and for the alignment section 14 to align the target image with the reference image, an image deformation with the eight degrees of freedom, such as that illustrated in FIG. 3, is considered in the coordinate conversion between a two-dimensional plane and a sphere. In other words, since the alignment section 14 carries out the alignment on a sphere, the image deformation illustrated in FIG. 3 can be performed when the image compositing section 18 (described below) carries out a projection from the sphere to a plane.

The reference image selecting section 11 may select a temporary reference image Itr as well as the reference image Ir.

Figure 9:
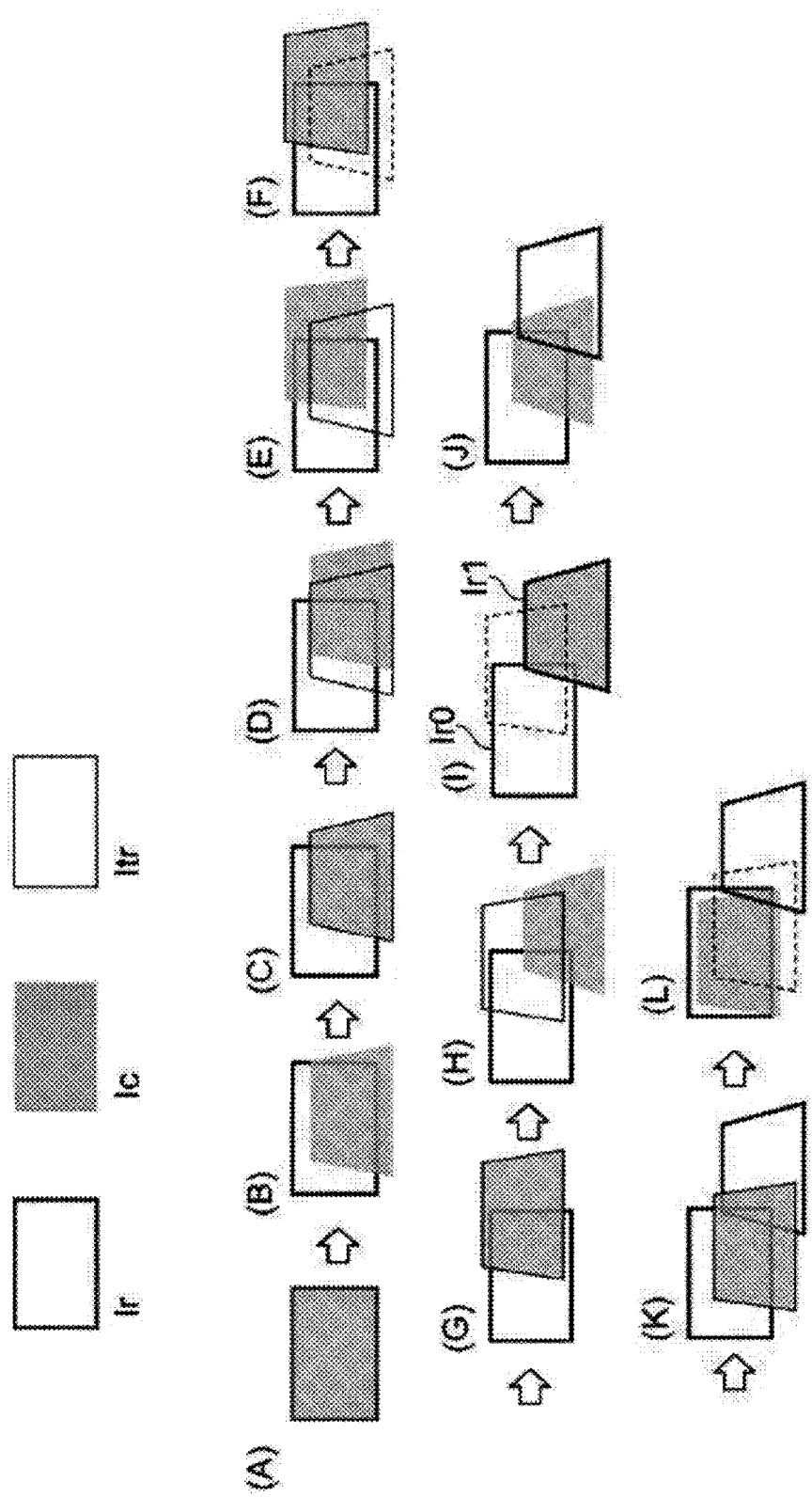
FIG. 9 is a schematic view illustrating the condition for selecting a reference image.

FIG. 9 is a schematic view illustrating the reference image Ir and the temporary reference image Itr.

First, as illustrated in (A), when an image is input, the image is set as the reference image Ir for the subsequent images. Then, as illustrated in (B), it is assumed that a target image Ic that is located at a certain distance or more from the reference image Ir is input. In this case, as illustrated in (C), the target image Ic is set as the temporary reference image Itr for the subsequent images. The temporary reference image Itr refers to a temporary reference image that is not saved as history.

Then, as illustrated in (D), it is assumed that a target image Ic that is located at a distance from the temporary reference image Itr is input, and, as illustrated in (E), a target image Ic that is at the certain distance or more from the temporary reference image Itr is input. In this case, as illustrated in (F) and (G), the current temporary reference image Itr is dropped, and the target image Ic is set as a new temporary reference image Itr for the subsequent images.

Then, as illustrated in (H), it is assumed that a target image Ic that is at the certain distance or more not only from the temporary reference image Itr but also from the reference image Ir is input. In this case, as illustrated in (I), the current temporary reference image Itr is dropped, and the target image Ic is set as a reference image Ir for the subsequent images. In this step, the old reference image, i.e. the first reference image, is referred to as Ir0, and the new reference image is referred to as Ir1. The information on characteristic points in the reference images Ir0, Ir1 is stored for the alignment.

Then, as illustrated in (J), it is assumed that a target image Ic that is at the certain distance or more also from the reference image Ir1 is input. In this case, as in (C), the target image Ic is set as a temporary reference image Itr for the subsequent images as illustrated in (K).

Then, as illustrated in (L), it is assumed that a target image Ic that is closer to the reference image Ir0 than to the temporary reference image Itr is input. In this case, the current temporary reference image Itr is dropped, and the reference image Ir0 is set as a reference image for the subsequent images. In this way, the information on the reference image is stored so that a target image can be aligned with reference to the past reference image even when the camera 20 comes back to the original position. Further, by using the temporary reference image Itr and the reference image Ir, it is possible to minimize the amount of data that must be recorded.

Figure 10:
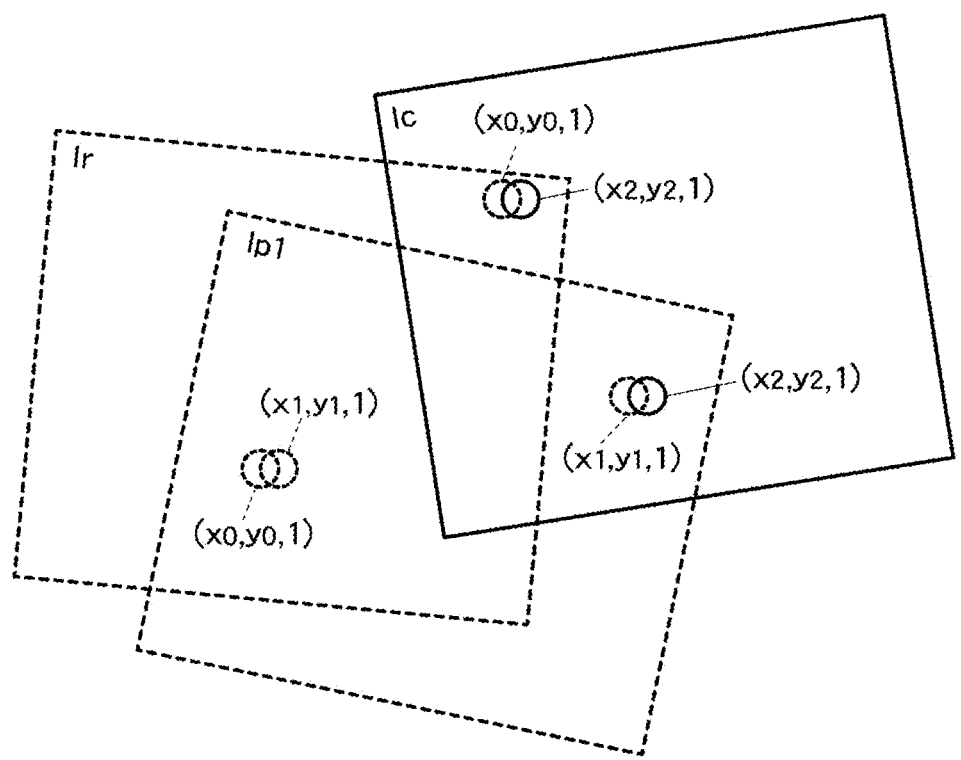
FIG. 10 is a schematic view illustrating a case in which the positions of a plurality of images are estimated at the same time.

The transformation matrix estimating section 13 may be configured such that when a plurality of images overlap each other, the displacement between the plurality of images is estimated at the same time. For example, as illustrated in FIG. 10, it is assumed that an image (past target image Ip1) overlaps both the reference image Ir and the target image Ic, and the reference image Ir and the past target image Ip1 have been already aligned, i.e. the transformation matrix $R_1$ has been already calculated. The coordinate of a characteristic point in the reference image Ir is (x0, y0, 1), the coordinate of the corresponding characteristic point in the past target image Ip1 is (x1, y1, 1), and the coordinate of the corresponding characteristic point in the target image Ic is (x2, y2, 1).

To calculate transformation matrix $R_2$ that associates the coordinate system of the reference image Ir with the coordinate system of the target image Ic, the conditions expressed by the following equations (7) are set.

$$\begin{pmatrix} x_0 \\ y_0 \\ z_0 \end{pmatrix} = R_1 \cdot \begin{pmatrix} x_1 \\ y_1 \\ 1 \end{pmatrix} \quad (7)$$

$$\begin{pmatrix} x_0 \\ y_0 \\ z_0 \end{pmatrix} = R_2 \cdot \begin{pmatrix} x_2 \\ y_2 \\ 1 \end{pmatrix}$$

$$R_1 \cdot \begin{pmatrix} x_1 \\ y_1 \\ 1 \end{pmatrix} = R_2 \cdot \begin{pmatrix} x_2 \\ y_2 \\ 1 \end{pmatrix}$$

The equations (7) associate the transformation matrix $R_1$ with the transformation matrix $R_2$. By the convergence calculation using an optimization method, the transformation matrix estimating section 13 concurrently estimates the $R_1$ and $R_2$ that satisfy the equations (7). In this case, information on pairs of characteristic points between the reference image Ir and the past target image Ip1 can be utilized. Further, concurrently estimating the transformation matrices between a plurality of images can reduce the accumulation of errors compared to the case in which images are serially linked to each other.

When a target image Ic is also close to a past reference image Ir, the transformation matrix estimating section 13 aligns the target image Ic with not only the current reference image Ir but also the past reference image Ir. For example, as illustrated in FIG. 11 (A), the target image Ic13 with the center C13 is linked to the reference image Ir12 with the center C12 by the link Re13, i.e. the relative position of the target image Ic 13 is determined.

Figure 11A:
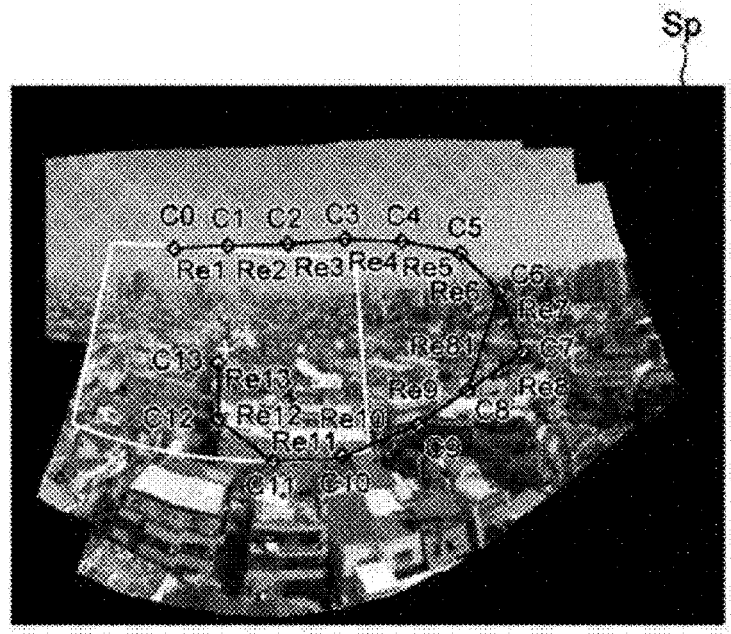
FIG. 11 (A) and FIG. 11 (B) are schematic views illustrating alignment between reference images.
Figure 11B:
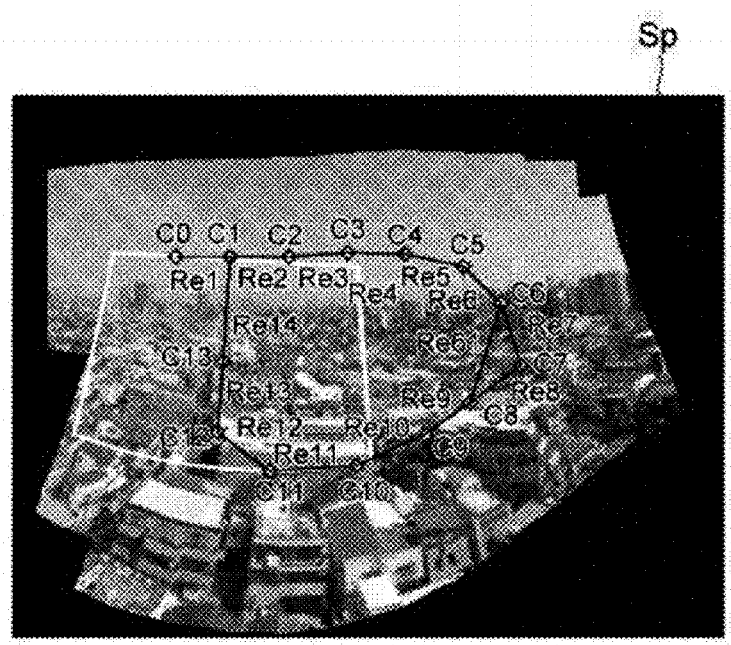

When the target image Ic13 is also close to a past reference image Ir1 with the center C1 as illustrated in FIG. 11 (B), the transformation matrix estimating section 13 aligns the target image Ic13 also with the reference image Ir1. As a result, the reference image Ir1 and the target image Ic13 are linked to each other by a link Re14. That is, alignment between the reference image Ir1 and the reference image Ir12 can be achieved by using the target image Ic13. In this way, using the target image Ic enables alignment between reference images Ir that are likely to overlap with each other only in a small area.

The alignment section 14 may perform overall alignment. The overall alignment means to adjust the overall positional relationship between images to be rendered (images written in an output image buffer). For example, when a new link is developed between reference images Ir, or when a plurality of past transformation matrices are updated as a result of concurrent estimation of the displacement between a plurality of images, the overall position of all target images to be rendered is finely adjusted. That is, the transformation matrices R for all images to be rendered are re-calculated.

The overall alignment is performed not by using the characteristic points output from the matching section 12, but by using corresponding points between images that are extracted randomly or at predetermined locations based on the alignment result and using the positional information of the extracted points. In this case, the memory usage can be reduced since it is not required to retain previously used pairs of characteristic points.

The difference value calculating section 15 calculates the difference values between pixel values of the reference image Ir and pixel values of the target image Ic, which are relative values representing the relative relationship between the reference image Ir and the target image Ic that have been aligned with each other by the alignment section 14.

Figure 12:
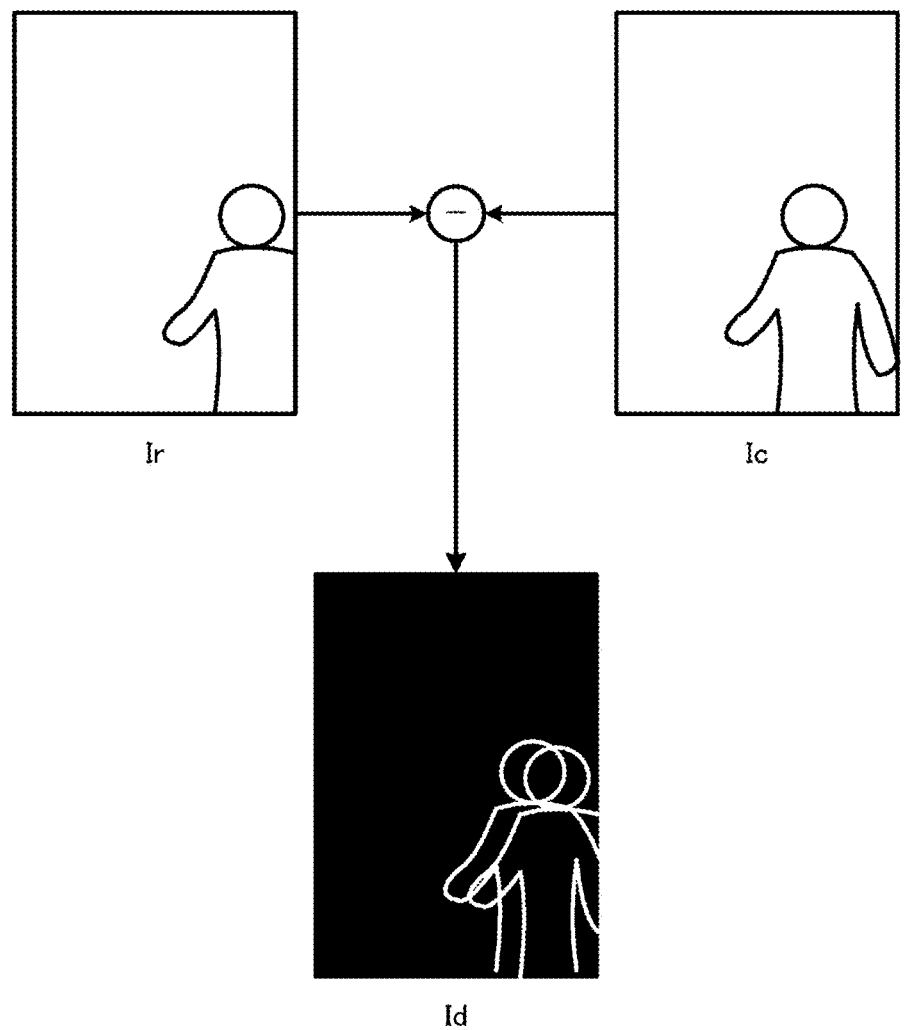
FIG. 12 is a schematic view illustrating the principle of generating a difference image.

FIG. 12 is a schematic view illustrating the principle of calculating the difference values.

FIG. 12 illustrates a reference image Ir in which the body of a person shown in the right end is partly out of the image, and a target image Ic in which the same person shown in the right is not out of the image. For ease of description, the reference image Ir and the target image Ic have the same size, and the two images are not displaced in the horizontal direction with respect to the camera 20.

The difference value calculating section 15 overlays the target image Ic with the reference image Ir and calculates the difference values between the pixel values of the pixels of the reference image Ir and the pixel values of the corresponding pixels of the target image Ic. In the following description, an image composed of pixels with the calculated difference values as the pixel values is referred to as a difference image Id. When the difference value calculating section 15 calculates the difference values, the difference image Id is generated in which the contour of the person is emphasized as illustrated in the lower part of FIG. 12. For ease of understanding, the difference image is depicted as a binary image in FIG. 12. However, the difference image can be depicted as a grayscale image in practice. That is, the difference image Id can be illustrated in a 256-level grayscale in which black represents the difference value "0" and white represents the difference value "255".

The boundary determining section 16 determines a boundary for compositing the reference image Ir and the target image Ic based on the result of the alignment by the alignment section 14 and the difference values of the difference image Id generated by the difference value calculating section 15. Specifically, the boundary determining section 16 determines the boundary by predetermined separation processing that separates the difference image, which is composed of pixels having the difference values calculated by the difference value calculating section 16 as the pixel values, into an image area of a target subject (hereinafter referred to as a "target subject area") and the other image area (hereinafter referred to as a "non-target subject area"). The target subject area is an image area of an object that is considered as a target subject and can also be referred to as an "object area".

To determine the boundary, a requirement in the first step is to set a pixel of the starting point of the boundary (hereinafter referred to as a "starting pixel") and a pixel of the end point of the boundary (hereinafter referred to as an "end pixel") in the difference image. To stitch the reference image Ir and the target image Ic together, it is required to form a boundary within an area (hereinafter referred to as an "overlapped area") where the aligned reference image Ir and target image Ic are overlapped with each other and then to composite the reference image Ir and the target image Ic by stitching them together at the boundary.

For example, two pixels are selected from the outer edge pixels of the overlapped area, and two pixels of the reference image Ir corresponding to the selected pixels are specified. Then, pixels of the difference image Id corresponding to the specified two pixels are respectively set as the starting pixel and the end pixel. Preferably, two pixels of the reference image Ir are specified so as to correspond to two of four corner pixels of the overlapped area located at the side of the target image Ic, and pixels of the difference image Id corresponding to the specified two pixels are respectively set as the starting pixel and the end pixel.

Figure 13:
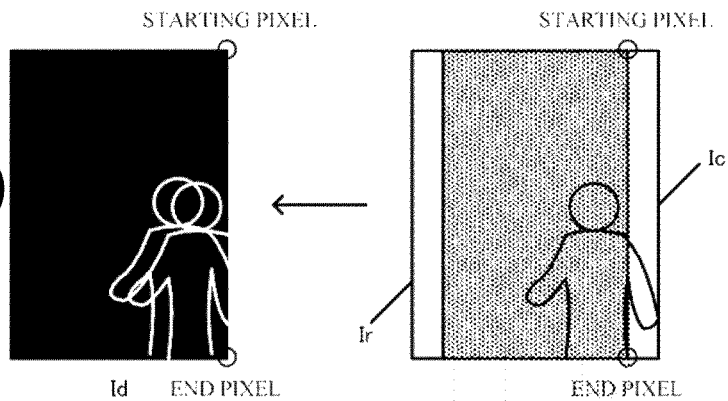
FIG. 13 (1) to FIG. 13 (3) are schematic views illustrating pixel set search processing.
Figure 13:
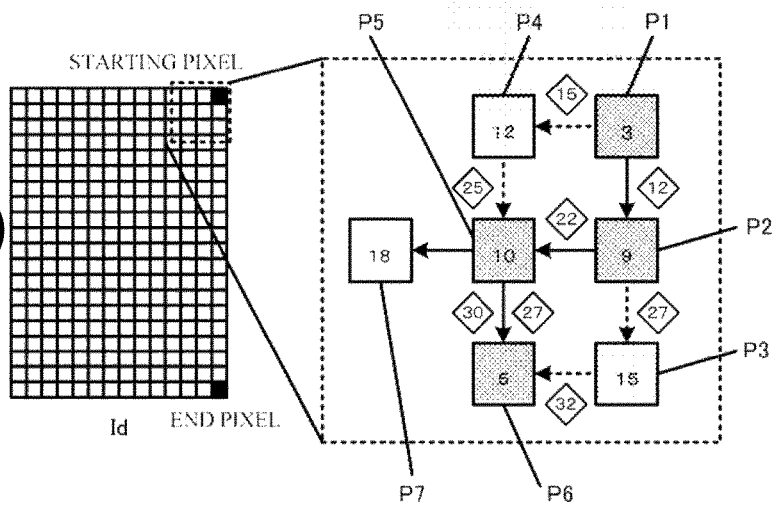
Figure 13:
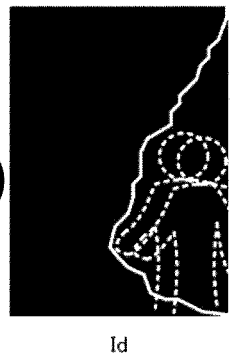

FIG. 13 (1) to FIG. 13 (3) are schematic views illustrating the principle of determining the boundary.

FIG. 13 (1) illustrates the difference image Id obtained as illustrated in FIG. 12. To the right is the reference image Ir and the target image Ic aligned with each other, which are the same images as those in FIG. 12, in which the overlapped area between the reference image Ir and the target image Ic is illustrated by hatching.

In the following example, two pixels at the upper right corner and the lower right corner of the reference image Ir, which are located at the side of the target image Ic to be composited, are selected from the four corner pixels of the hatched overlapped area, and pixels of the difference image Id corresponding to the selected two pixels, i.e. pixels at the upper right corner and the lower right corner of the difference image Id, are set as the starting pixel and the end pixel respectively.

In separation processing for separating the target subject area from the non-target subject area, the boundary determining section 16 performs minimum cost pixel set search processing to search for a set of pixels of the boundary, in which a set of pixels that minimizes a total cost value is determined. The total cost value is calculated as the sum of the difference values of pixels from the starting pixel to the end pixel. Further, the total cost value corresponds to an evaluation value that is calculated based on relative values of the pixels, and the total cost value being the minimum value is a predetermined separation condition for separating the target subject area from the non-target subject area.

The processing will be described more specifically. FIG. 13 (2) illustrates an enlargement of seven pixels in the difference image that are located in the upper right part surrounded by the dashed line. Each rectangle in the area surrounded by the dashed line represents one pixel, and the value shown in each rectangle is the difference value of the pixel. For descriptive reasons, the starting pixel is referred to as P1, and the other six pixels are referred to as P2 to P7. Further, the pixels are connected by arrowed lines, and the cost values of possible paths from the starting pixel P1 are shown in diamonds associated with the arrowed lines.

The arrowed lines are followed from the starting pixel, and the difference values of pixels in the path are accumulated so that the cost value is updated. Then, the minimum cost value and the pixels included in the corresponding path are stored. In this way, the total cost value, which is the sum of cost values in a path to the end pixel, is calculated as an evaluation value, and a set of pixels that gives the minimum total cost value is determined as the boundary.

For example, possible paths from the starting pixel P1 to the pixel P6 are considered, in which the starting pixel P1 and the pixels P2, P3, P4, P5, P6 and P7 have difference values of 3, 9, 15, 12, 10, 5 and 18 respectively.

(1) Path P1-P2-P3-P6

The total cost value from P1 to P2 is "3+9=12", and the total cost value from P1 to P2 to P3 is "12+15=27". Accordingly, the total cost value from P1 to P2 to P3 to P6 is "27+5=32".

(2) Path P1-P2-P5-P6

The total cost value from P1 to P2 is "3+9=12", and the total cost value from P1 to P2 to P5 is "12+10=22". Accordingly, the total cost value from P1 to P2 to P5 to P6 is "22+5=27".

(3) Path P1-P4-P5-P6

Similarly, the total cost value from P1 to P4 is "3+12=15", and the total cost value from P1 to P4 to P5 is "15+10=25". Accordingly, the total cost value from P1 to P4 to P5 to P6 is "25+5=30".

The total cost value of any path through the pixel P7 is greater than the above three paths, since the pixel value of the pixel P7 is "18". Accordingly, the minimum total cost value is not attained in any path through the pixel P7 to the pixel P6.

Among the three paths described above, (2) the path P1-P2-P5-P6 gives the minimum total cost value. Accordingly, regarding the path from the starting pixel P1 to the pixel P6, the minimum total cost value is attained in the set of pixels composed of P1-P2-P5-P6.

As described above, the total cost values of paths from the starting pixel to the end pixel are stored along with the other pixels involved in the respective paths, and a set of pixels from the starting pixel to the end pixel that has the minimum total cost value is determined as the boundary. In this way, for example, a boundary illustrated by the white solid line in FIG. 13 (3) is determined.

In the difference image Id of FIG. 13 (1), the contour of a person, who is a target subject (object), is detected. Since the location of the person is different between the reference image Ir and the target image Ic, the contour part of the target subject person exhibits a high difference value between the reference image Ir and the target image Ic. In the minimum cost pixel set search processing, since the boundary is determined by following pixels with a lower difference value, the target subject person is avoided when determining the boundary. That is, the minimum cost pixel set search processing determines the boundary that can separate the target subject area and the non-target subject area from each other.

The restraint condition setting section 17 sets a restraint condition for the boundary determining section 16 when determining the boundary. The restraint condition setting section 17 sets a restraint condition that restricts the boundary from being formed in a predetermined boundary restraint area where forming a boundary is restricted.

Besides the target subject, a variety of objects are shown in the reference image Ir and the target image Ic. Accordingly, the boundary determined by the minimum cost pixel set search processing does not always avoid the contour of a person.

A major problem is that the boundary may be formed on a human face. When the boundary is formed on a human face, since the reference image Ir and the target image Ic are stitched together at the boundary, the human face may be doubled, distorted or partially lacking in the resultant composite image. To address the problem, in the embodiment, a predetermined area including a human face is set as a boundary restraint area, and a restraint condition is set in order to restrain the boundary from being formed in the predetermined area.

In the embodiment, face detection processing for detecting human faces is performed, which is a type of object detection processing. Specifically, a human face is detected from the reference image Ir and the target image Ic by a method known in the art such as the Viola-Jones method and face detection techniques using the Haar-like features. Then, the area in the difference image Id that corresponds to the predetermined area including the face detected by the face detection processing is set as the boundary restraint area, and the difference values of all pixels in the boundary restraint area are changed.

Figure 14:
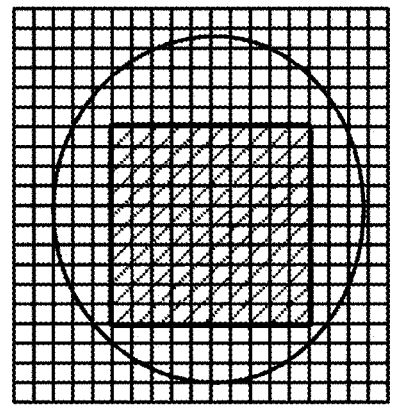
FIG. 14 (1) to FIG. 14 (3) are schematic views illustrating the principle of setting a boundary restraint area.
Figure 14:
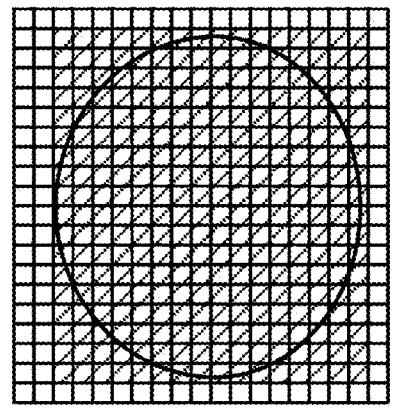
Figure 14:
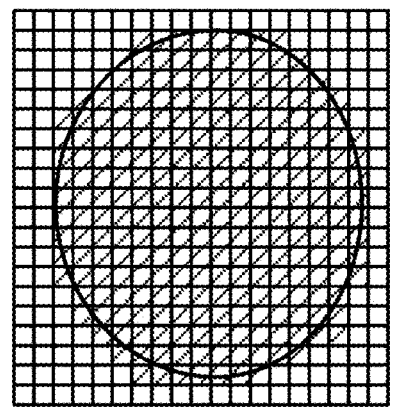

FIG. 14 (1) to FIG. 14 (3) illustrate the principle of setting the boundary restraint area.

FIG. 14 (1) to FIG. 14 (3) illustrate a part of the difference image Ir in which a human face is included. Each rectangle represents a pixel, the oval represents a human face, and the contour of the oval represents the contour of the human face. In FIG. 14 (1) to FIG. 14 (3), the areas composed of the hatched pixels are the boundary restraint areas.

As illustrated in FIG. 14 (1), when a rectangular area at the center of a face is detected as a human face by the face detection processing based on features such as the eyes, nose or mouth of a human, the detected rectangular area is set as the boundary restraint area.

As illustrated in FIG. 14 (2), when the contour of a human face is detected by the face detection processing, the minimum rectangular area covering the whole human face including the detected contour is set as the boundary restraint area.

In the embodiment, the difference values of the pixels in the above-described boundary restraint area are changed to a specified pixel value based on the restraint condition. The specified pixel value may be any value that is higher than the highest value (hereinafter referred to as the "highest difference value") of the different values of the pixels outside the boundary restraint area. In the most preferred example, the specified pixel value is "255", which is the highest gray level when the difference image is illustrated in grayscale.

The pixel values of the pixels of the boundary restraint area are set to the specified pixel value, which is higher than the highest difference value. Accordingly, a path that runs through any pixel in the boundary restraint area has a higher total cost value than a path that runs through the other pixels. As a result, a set of pixels that does not include the pixels in the boundary restraint area is selected as the boundary.

Instead of the method of setting the boundary restraint area as illustrated in FIG. 14 (2), for example, an area that covers a whole human face including the contour thereof may be set as the boundary restraint area as illustrated in FIG. 14 (3). That is, the pixels that are located outside the pixels of the face contour in FIG. 14 (2) may be excluded from the boundary restraint area. In this case, the pixels that are located outside the pixels of the face contour are allowed to be a part of the boundary, and the area of pixels that can be the boundary can thus be expanded.

When there are a plurality of human faces in an input image, each of them is detected by the face detection processing. Then, the respective areas including the human faces are set as the boundary restraint areas for determining the boundary.

The image compositing section 18 renders a group of images that are aligned with each other by the alignment section 14 on the sphere in the three-dimensional space using the transformation matrix estimated by the transformation matrix estimating section 13 so as to create an image Id. The image compositing section then projects the image Id to a two-dimensional composition plane Sp. During the projection from the sphere to the composition plane Sp, image deformation, for example those illustrated in FIG. 3, is carried out. Then, the image is recorded in the output image buffer as a single composite image.

Figure 15:
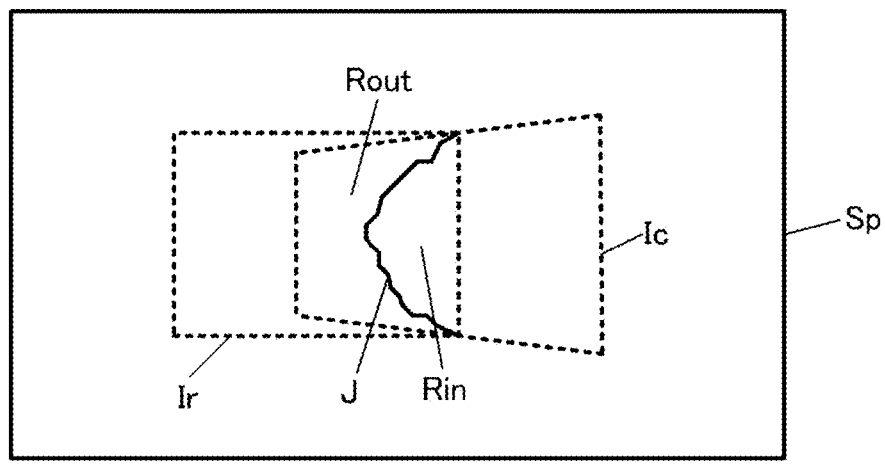
FIG. 15 is a schematic view illustrating the principle of rendering a target image to a composite plane.

FIG. 15 is a schematic view illustrating the principle of rendering the image Id.

The outer solid line represents the plane Sp. The dashed lines represent the reference image Ir and the target image Ic that are aligned with each other. The image is composed of the aligned reference image Ir and the target image Ic that are aligned with each other.

In the area in the image where the reference image Ir and the target image Ic overlap with each other, the image compositing section 18 renders the pixel values of the target image Ic to the composite plane Sp in an area Rin (hereinafter referred to as an "inner area") that covers the target image Ic-side of the boundary. Further, in the overlapped area, the image compositing section 18 composites the pixel values of the target image Ic with the pixel values of the reference image Ir by alpha blending and renders the resultant pixel values to the composite plane Sp in an area Rout (hereinafter referred to as an "outer area") that covers the reference image Ir-side of the boundary.

Alpha blending is a technique of combining two images by using a coefficient (a value).

Specifically, for the pixels in the outer area Rout, a weight a is set to the pixel values of the target image Ic while a weight ($\alpha-1$) is set to the pixel values of the reference image Ir, and the weighted averages of the pixel values of the target image Ic and the pixel values of the reference image Ir are calculated.

In this process, it is desirable that the alpha blending is performed such that the pixel values of the target image Ic are weighted more in a part near the boundary J while the pixel values of the reference image Ir are weighted more in the marginal part of the outer area Rout. For this reason, it is preferred that the alpha blending is performed such that the weight a is set to the maximum value "1" for the pixel on the boundary J and is set to the minimum value "0" for the pixel on the edge of the outer area Rout while the weight ca is gradually decreased from the boundary J to the edge of the outer area Rout.

Figure 16:
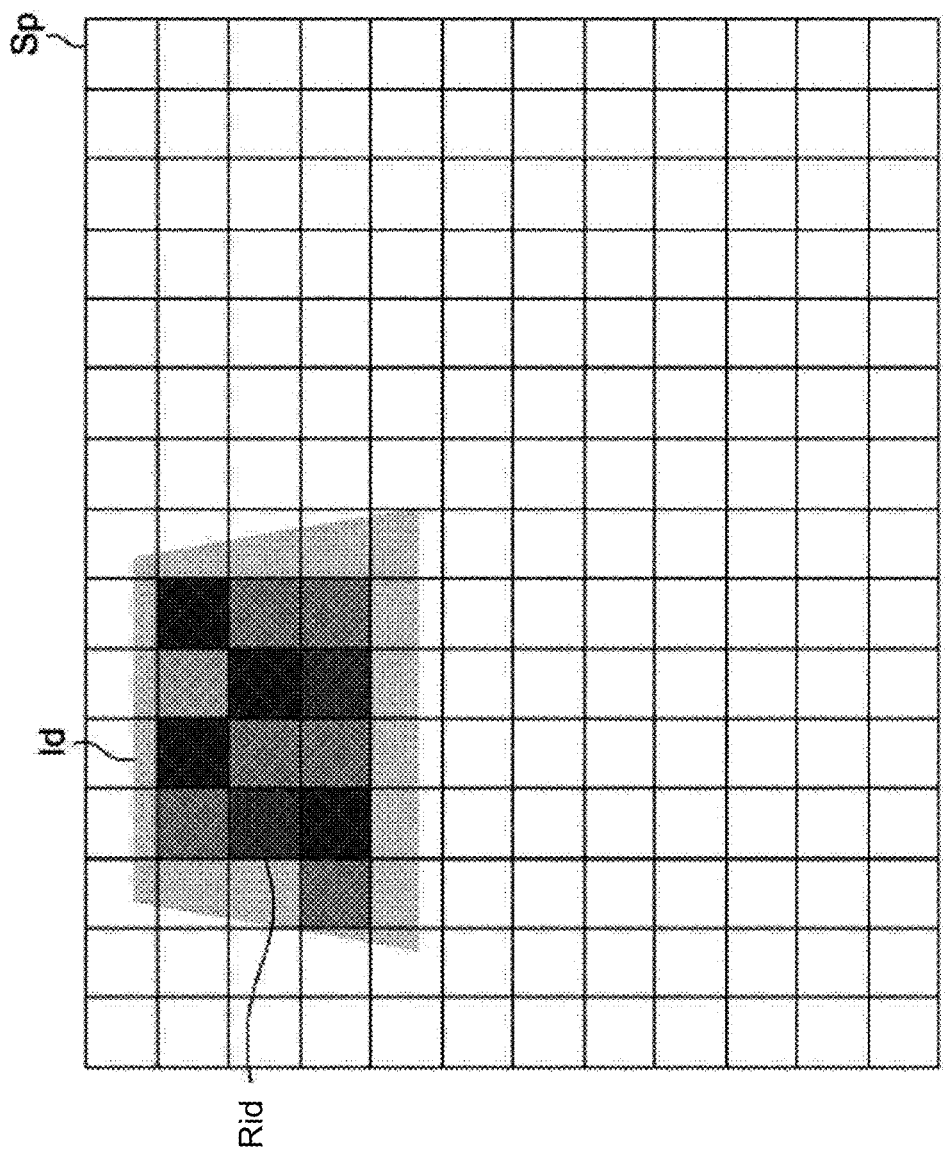
FIG. 16 is a schematic view illustrating the principle of projecting a target image to a composite plane.

As illustrated in FIG. 16, the composite plane Sp may be divided in a grid pattern. In this case, considering image deformation as illustrated in FIG. 3, the image compositing section 18 renders only cells (e.g. Rid in FIG. 16) with the four corners that are all located inside the image Id projected on the composition plane Sp.

The image thus rendered is the finally generated composite image.

1-2. Processing

Figure 17:
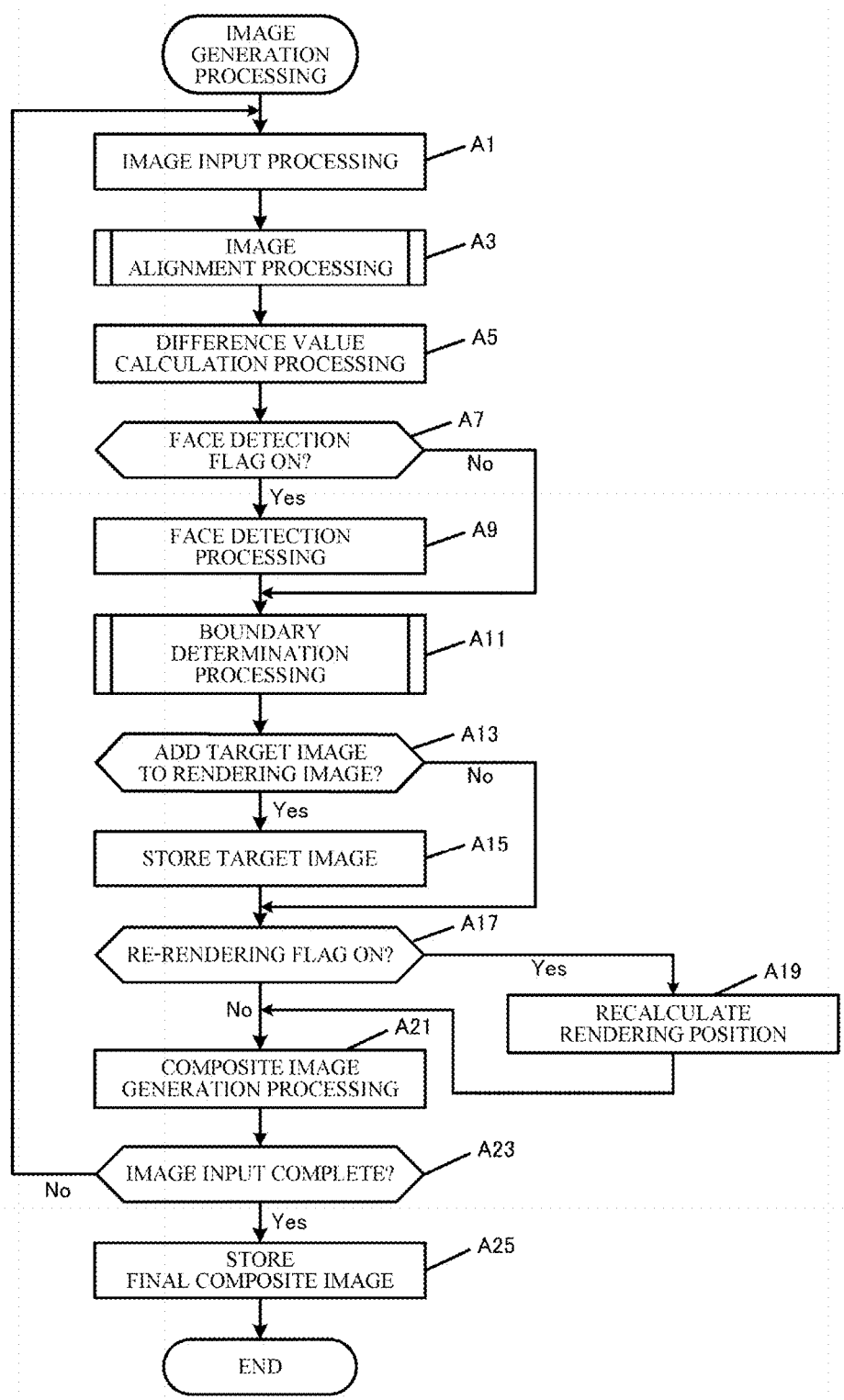
FIG. 17 is a flowchart illustrating an example of the flow of image generation processing.

FIG. 17 is a flowchart illustrating an example of the flow of the image generation processing, which is executed by the image generating apparatus 1. For ease of understanding, it is assumed that a target image Ic is the second input image or an image input after the second image.

First, the input section 10 performs image input processing (A1). Specifically, the input section 10 inputs the target image Ic from the camera 20. Then, the alignment section 14 performs image alignment processing (A3).

Figure 18:
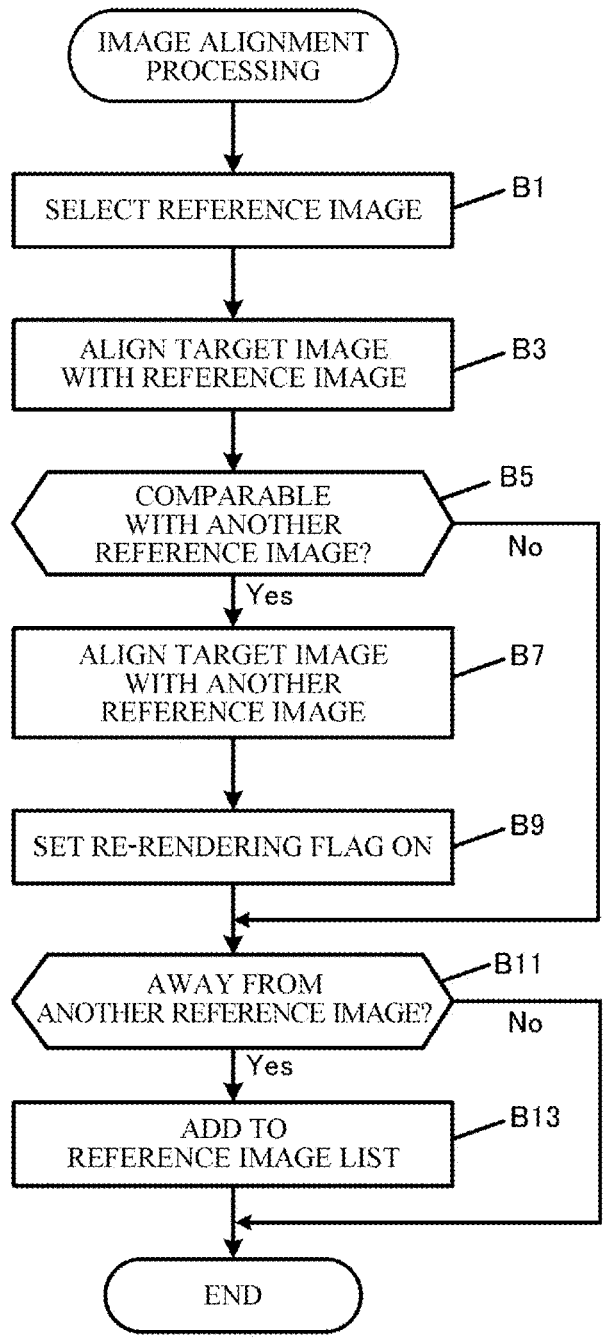
FIG. 18 is a flowchart illustrating an example of the flow of image alignment processing.

FIG. 18 is a flowchart illustrating an example of the flow of the image alignment processing.

First, the reference image selecting section 11 selects an image from among the pre-input images to be set as the reference image Ir (B1). Then, based on the estimation result by the matching section 12 and the transformation matrix estimating section 13, the alignment section 14 performs the alignment of the target image Ic with the reference image Ir (B3).

Then, the alignment section 14 makes a determination as to whether the target image Ir can be compared with the past (other) reference image Ir (B5). Specifically, when the distance between the center of the reference image Ir and the center of the target image Ic is not greater than (or less than) a predetermined value, it is determined that the target image Ic can be compared with the reference image Ir. Then, if it is determined to be comparable (B5, Yes), the alignment section 14 aligns the target image Ic with the past reference image Ir (B7).

Then, the alignment section 14 sets a re-rendering flag to "ON" for the overall alignment (B9). Thereafter, the reference image selecting section 11 makes a determination as to whether the distance between the target image Ic and the past reference image Ir is equal to or greater than a predetermined value (B11). If it is determined that the distance is equal to or greater than the predetermined value (B11, Yes), the reference image selecting section 11 stores the target image Ic in a reference image list as the reference image Ir for the subsequent images. The reference image list is a list that is used for referencing a data on the pixel values and the coordinates of characteristic points in the reference image. When the step B13 is complete, the image alignment processing ends.

In B5, if it is determined not to be comparable with the other reference image (B5, No), the processing proceeds to B11 where the reference image selecting section 11 makes a determination regarding the distance between the target image Ic and the past reference image Ir. If it is determined in B11 that the distance is less than the predetermined value (B11, No), the image alignment processing ends.

Returning to the image generation processing, after the image alignment processing, the difference value calculating section 15 performs difference value calculation processing to calculate the difference values between the pixel value of the reference image Ir and the pixel values of the target image Ic (A5).

Then, the boundary determining section 16 makes a determination as to whether a face detection flag is "ON" (A7). If it is determined that the face detection flag is "ON" (A7, Yes), it performs face detection processing to detect a human face from the target image Ic (A9).

Then, the boundary determining section 16 performs boundary determination processing to determine the boundary based on the difference values calculated in the difference value calculation processing (A11).

Figure 19:
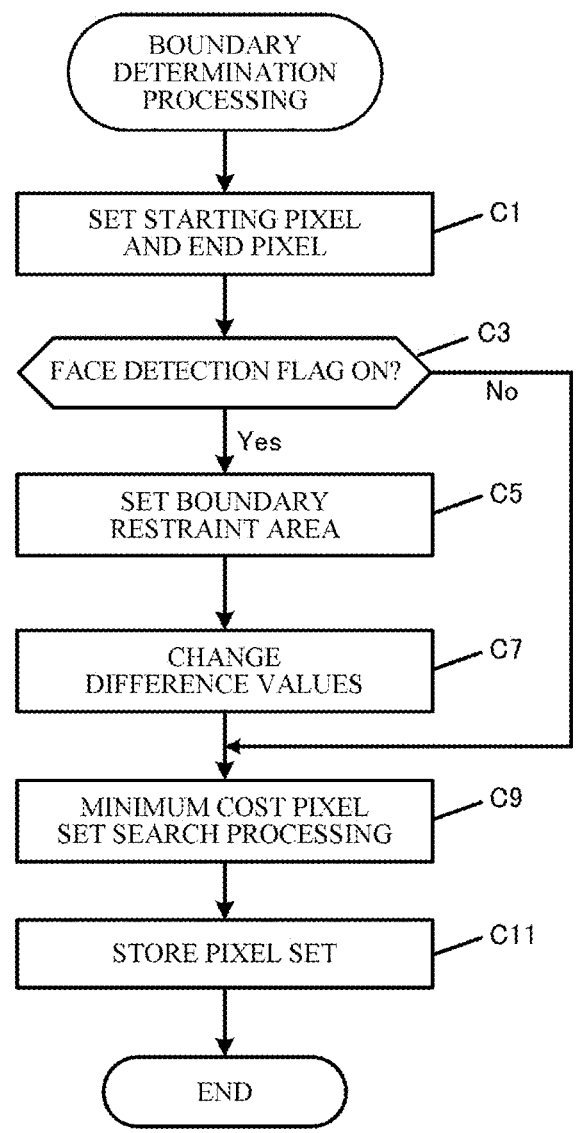
FIG. 19 is a flowchart illustrating an example of the flow of boundary determination processing.

FIG. 19 is a flowchart illustrating an example of the flow of the boundary determination processing.

First, the boundary determining section 16 sets the starting pixel and the end pixel (C1). The method of setting the starting pixel and the end pixel is described above.

Then, the boundary determining section 16 makes a determination as to whether the face detection flag is "ON" (C3). If it is determined that the flag is "ON" (C3, Yes), it sets the boundary restraint area that includes the human face detected by the face detection processing (C5). Then, the boundary determining section 16 performs correction processing to change the difference values of the pixels in the set boundary restraint area (C7).

Then, the boundary determining section 16 performs the minimum cost pixel set search processing (C9). Then, the boundary determining section 16 stores a set of pixels (the boundary) found in the minimum cost pixel set search processing so as to associate it with the reference image and the target image (C11). Then, the boundary determining section 16 ends the boundary determination processing.

Returning to the image generation processing, after the boundary determination processing, the image compositing section 18 makes a determination as to whether the target image Ic that has been input in A1 is added as an image to be rendered (A13). For example, the image compositing section 18 is configured to be able to reference a list of images to be rendered that is used for referencing image information on images to be rendered. When the distance to the closest image among the listed images is equal to or greater than a predetermined value, the target image Ic that has been input in A1 is added as an image to be rendered. If it is determined to add the target image Ic as an image to be rendered (A13, Yes), the image compositing section 18 adds the target image Ic in the rendering list and stores the target image Ic (A15).

Then, the image compositing section 18 makes a determination as to whether the re-rendering flag is "ON" (A17). If it is determined that the flag is "ON" (A17, Yes), rendering position recalculation processing is performed (A19). In the recalculation processing, the alignment section 14 performs the overall alignment. In this step, the alignment section 14 adjusts the position of all the images by using the transformation matrices updated by the transformation matrix estimating section 13.

If it is determined in A17 that the re-rendering flag is "OFF" (A17, No), or after step A19 is complete, the image compositing section 18 performs composite image generation processing to generate the composite image (A21).

Specifically, images to be rendered are specified from the rendering image list and are projected from the sphere in the three-dimensional space to the two-dimensional plane. In this step, the image is rendered based on the boundary that has been determined by the boundary determination processing. The pixels in the inner area of the boundary, i.e the area Rin in FIG. 15, are rendered by allocating the pixel values of the target image Ic to the corresponding cells. The pixels in the outer area of the boundary, i.e the area Rout in FIG. 15, are rendered by being allocated to the corresponding cells the pixel values that are obtained by alpha blending of the pixel values of the reference image Ir and the pixel values of the target image Ic.

Then, the input section 10 makes a determination as to whether the image input is complete (A23). If it is determined that the input is not complete (A23, No), the process returns to A1. If it is determined that the image input is complete (A23, Yes), the image compositing section 18 stores the final composite image (A25). Then, the image generation processing ends.

1-3. Functions and Advantageous Effects

The image generating device 1 stitches sequentially input images together to generate the composite image. The difference value calculating section 15 calculates the difference values from the pixel values of the reference image and the pixel values of the target image that partly overlaps the reference image. The difference values thus obtained represent the relative relationship between the reference image and the target image. The boundary determining section 16 determines the boundary for stitching the reference image and the target image by using the difference values calculated by the difference value calculating section 15. Then, the image compositing section 18 composites the target image with the reference image based on the boundary determined by the boundary determining section 16 to generate the composite image.

The difference values between the reference image and the target image show a change in the relative positional relationship of the background and the subject between the reference image and the target image. Accordingly, by using the difference values between the reference image and the target image, it becomes possible to determine a suitable position for the boundary at which the reference image and the target image are stitched together. As a result, the high-quality composite image can be obtained by the image composition.

Specifically, the image compositing section 18 determines the boundary by performing predetermined separation processing to separate the difference image, which is composed of difference values as pixel values calculated by the difference value calculating section 15, into the target subject area, which is an image area including the target subject, and the non-target subject area, which is the other image area. This enables a determination of a boundary that can separate the target subject area and the non-target subject area from each other in compositing the target image with the reference image. As a result, the composite image thus generated by the image composition becomes a high-quality image with no discordance in the target subject area.

1-4. Variations

The above-described image generating device 1 is merely an example of the image generating device according to the present disclosure, and the image generating device according to the present disclosure is not limited to the image generating device 1. The image generating device according to the embodiment can be changed or applied to other devices without departing from the features recited in the claims.

For example, while the camera 20 serially captures still images in the above-described embodiment, the camera 20 may capture a movie instead. In this case, the input section 10 may have a function of extracting serial images from the recorded movie. Alternatively, the input section 10 may input images that are transmitted from another device through a network.

Further, while the images captured by the camera 20 have the same size in the above-described embodiment, the photographed images may vary in size in each photographing.

Further, while the image generating device 1 includes the input section 10, the reference image selecting section 11, the matching section 12, the transformation matrix estimating section 13, the alignment section 14, the difference value calculating section 15, the boundary determining section 16, the restraint condition setting section 17 and the image compositing section 18 in the above-described embodiment, the configuration thereof may be suitably changed according to the required performance.

Further, in the above-described embodiment, the images are deformed in the eight degrees of freedom as illustrated in FIG. 3. However, the deformation is not limited to the eight degrees of freedom. For example, the deformation may be performed in six degrees of freedom shown in (A) to (F) of FIG. 3.

2. First Example

Next, a smartphone 2 will be described, which is an example of an electronic device equipped with the above-described image generating device 1. It should be understood that the examples to which the present disclosure is applicable are not limited to the following examples.

2-1. Functional Configuration

Figure 20:
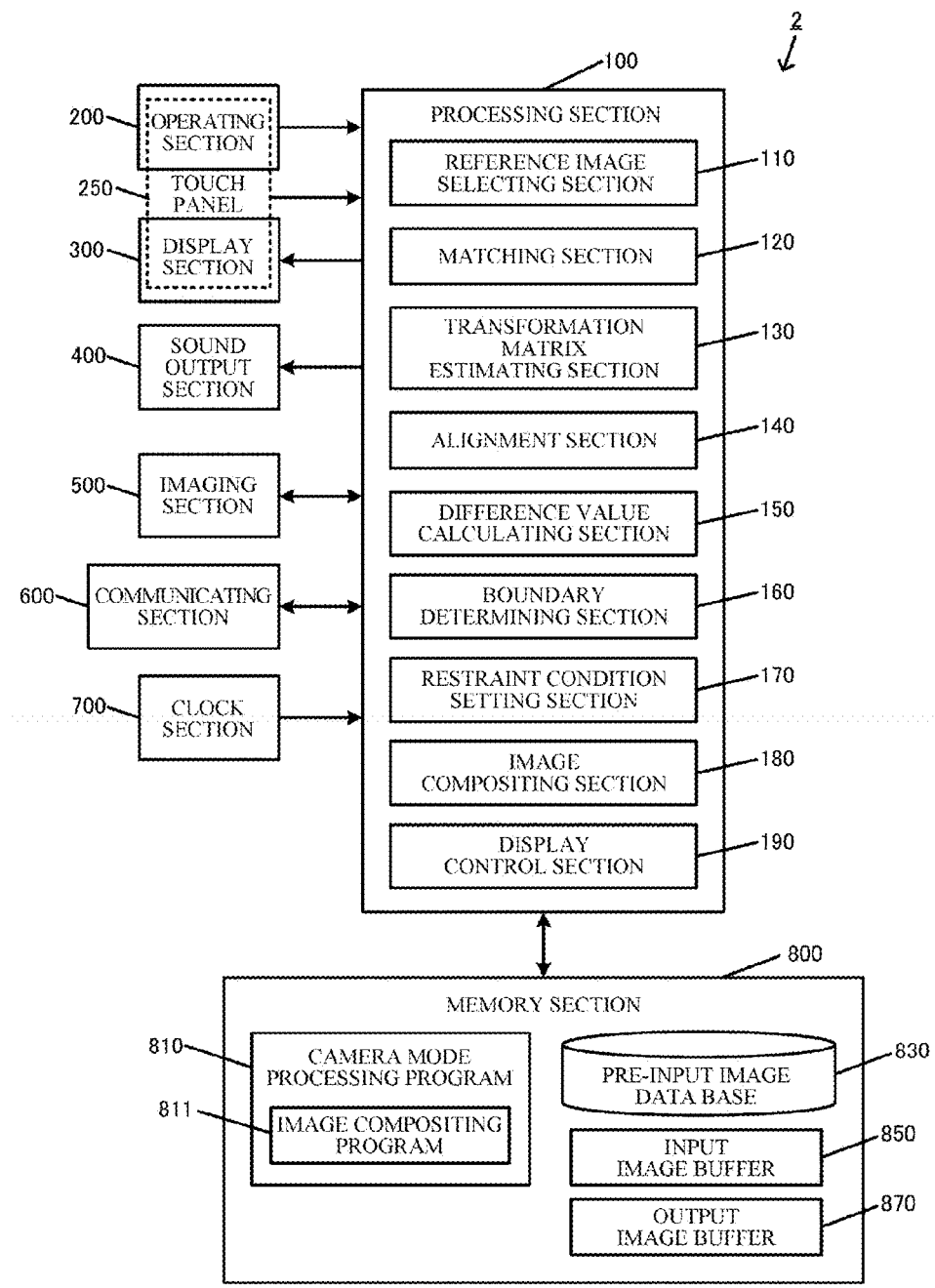
FIG. 20 is a block diagram of an example of the functional configuration of a smartphone.

FIG. 20 is a block diagram illustrating an example of the functional configuration of the smartphone 2.

The smartphone 2 includes a processing section 100, an operating section 200, a display section 300, a sound output section 400, an imaging section 500, a communicating section 600, a clock section 700 and a memory section 800.

The processing section 100 integrally controls the components of the smartphone 2 according to a variety of programs stored in the memory section 800 such as a system program and performs a variety of processing related to image processing. The processing section 100 includes a processor such as a CPU and a DSP, and an integrated circuit such as an ASIC.

As main functional sections, the processing section 100 includes a reference image selecting section 110, a matching section 120, a transformation matrix estimating section 130, an alignment section 140, a difference value calculating section 150, a boundary determining section 160, a restraint condition setting section 170, an image compositing section 180 and a display control section 190. These functional sections correspond respectively to the functional sections of the image generating device 1 of FIG. 1.

The operating section 200 includes an input device that is used for the user to input a variety of operations to the smartphone 2, such as an operation button, an operation switch and a mouse. The operation section 200 includes a touch panel 250 that is integrally formed with the display section 300. The touch panel 250 serves as an input interface between the user and the smartphone 2. The operation section 200 outputs an operation signal according to a user operation to the processing section 100.

The display section 300 is a display device that includes an LCD (liquid crystal display) and the like. The display section 300 displays a variety of information based on the display signal output from the processing section 100. The display section 300 is integrally formed with the touch panel 250 to serve as a touch screen. The display section 300 displays a variety of images such as photographed images and corrected images.

The sound output section 400, which is a sound output device with a speaker or the like, outputs a variety of sounds based on a sound output signal output from the processing section 100.

The imaging section 500, which is an imaging device capable of capturing an image of an arbitrary scene, includes an imaging element such as a CCD (charge coupled device) imaging sensor and a CMOS (complementary MOS) imaging sensor. The imaging section 500 coverts a light signal to an electric signal to output a digitized photographed image data to the processing section 100.

The communicating section 600 is a communicating device for transmitting and receiving information to be used in the device to and from an external information processing device. The communicating section 600 may use any of a variety of communication methods including wired connection via a cable compatible with a predetermined communication standard, connection via an intermediate device known as a cradle, which also serves as a charger, a wireless connection using a near field communication technique, and the like.

The clock section 700, which is an internal clock of the smartphone 2, includes, for example, a quartz oscillator composed of a quartz resonator and an oscillating circuit. The time acquired by the clock section 700 is constantly output to the processing section 100.

The memory section 800 is a storage device that includes a volatile or non-volatile memory such as a ROM an EEPROM, a flash memory and a RAM, and/or a hard disk drive, and the like. The memory section 800 stores a system program for the processing section 100 to control the smartphone 2, and programs and data for a variety of image processing.

In the example, the memory section 800 stores a camera mode processing program 810 that is read out and executed as a camera mode processing by the processing section 100. The camera mode processing program 810 includes an image generating program 811 as a sub-routine, which is executed as the image generation processing.

The memory section 800 further includes a pre-input image database 830 that stores image information of a photographed image input from the imaging section 500 to the processing section 100 as a pre-input image, an input image buffer 850 that temporarily stores sequentially input photographed images, and an output image buffer 870 that stores a generated final composite image.

2-2. Processing

Figure 21:
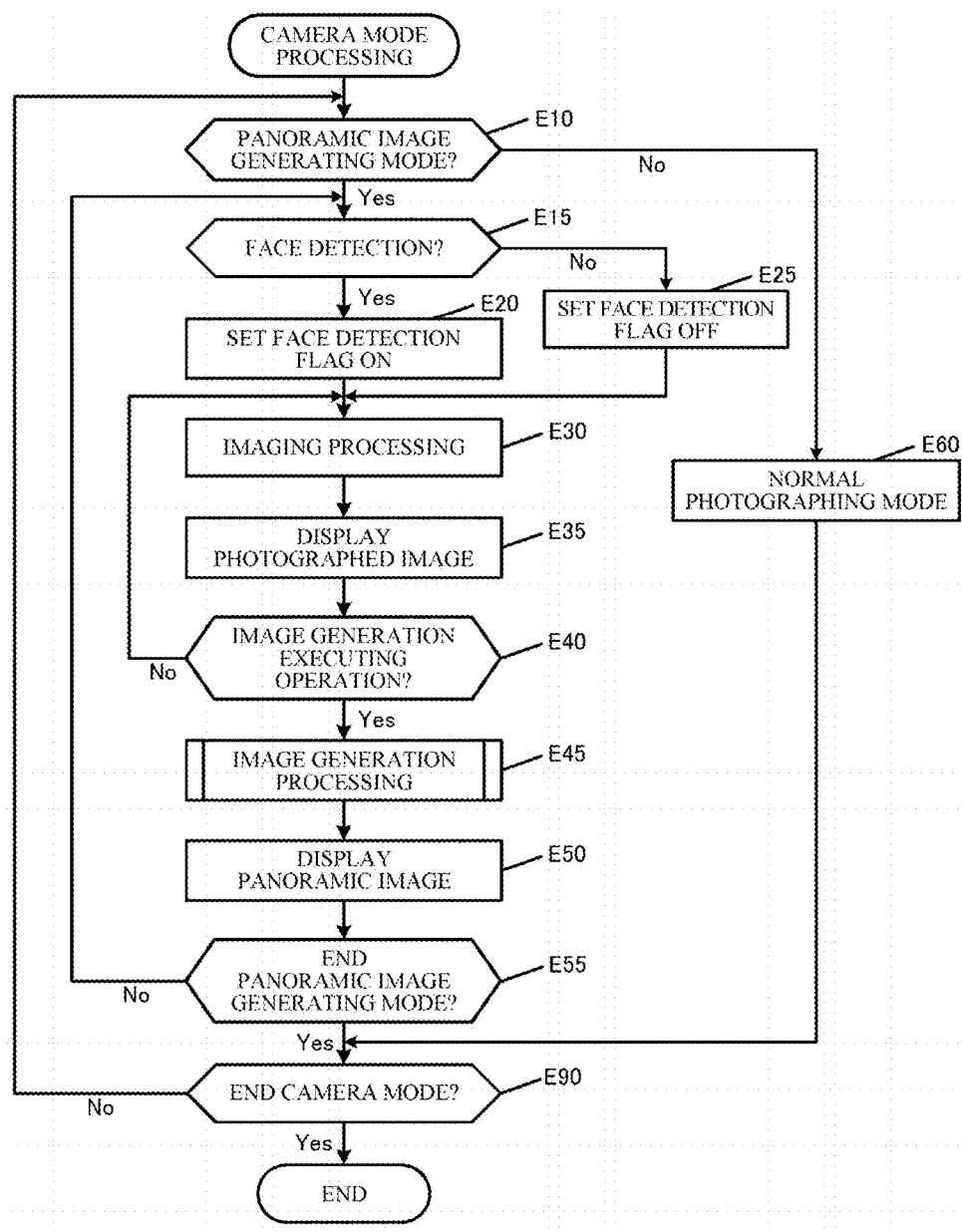
FIG. 21 is a flowchart illustrating an example of the flow of camera mode processing.

FIG. 21 is a flowchart illustrating an example of the flow of the camera mode processing, which is executed by the processing section 100 according to the camera mode processing program 810 stored in the memory section 800. The camera mode processing is performed when the user activates a camera application.

First, the processing section 100 makes a determination as to whether the mode selected by the user through the operating section 200 is a panoramic image generating mode (E10). In the panorama image generating mode, the user takes a plurality of images at a certain point with different directions, and the photographed images are stitched together so that a panoramic image, which is a single wide-angle still image is generated. The panoramic image generating mode is suitably used for selfies and group photos.

If it is determined that the selected mode is the panoramic image generating mode (E10, Yes), the processing section 100 makes a determination as to whether the user activates face detection for detecting a human face (E15). If it is determined that the face detection is activated (E15, Yes), it sets a face detection flag to "ON" (E20). If it is determined that the face detection is not activated (E15, No), it sets the face detection flag to "OFF" (E25).

Then, the processing section 100 performs imaging processing in which the imaging section 500 captures one image according to a user photographing operation on the operating section 200 (E30). Although the detailed steps of photographing are not described here, the display section 300 displays a standby imaging screen (finder screen) in which a photographing subject (photographing scene) is shown in a standby state, and the imaging processing is performed when the user does a photographing operation while the standby imaging screen is displayed. The user changes the photographing direction while holding the smartphone 2 in his/her hand, so as to change the photographing subject (photographing scene). Corresponding to this, the image shown in the standby imaging screen is also changed. When the imaging by the imaging section 500 is completed, the display control section 190 displays the photographed image on the display section 300 (E35).

Then, the processing section 100 makes a determination as to whether the user performs an execution operation for generating a panoramic image through the operating section 200 (E40). If it is determined that the execution operation is not performed (E40, No), the process returns to E30 where the imaging processing is performed again, and the imaging section 500 captures an image according to a user photographing operation on the operation section 200.

If it is determined that the user performs the execution operation for generating a panoramic image (E40, Yes), the processing section 100 performs the image generation processing based on the image generating program 811 stored in the memory section 800 (E45). The image generation processing is as illustrated in FIG. 17.

Then, the display control section 190 displays the composite image generated in the image generation processing on the display section 300 as a panoramic image (E50). Thereafter, a determination is made as to whether the user performs an operation of terminating the panoramic image generating mode (E55). If it is determined that the operation is not performed (E55, No), the process returns to E15.

On the other hand, if it is determined in E10 that the panoramic image generating mode is not selected (E10, No), the processing section 100 performs normal photographing mode processing (E60). In the normal photographing mode processing, the processing section 100 performs a control so that the imaging section 500 captures an image according to a user photographing operation on the operating section 200, the memory section 800 stores the photographed image captured by the imaging section 500, and the display section 300 displays the image.

If it is determined in E55 that the operation of terminating the panoramic image generating mode is performed (E55, Yes), the process returns to E10. Also, after E60, the processing section 100 makes a determination as to whether the user performs an operation of terminating the camera mode (E90), and if it is then determined that the terminating operation is not performed (E90, No), the process returns to E10. If it is determined that the terminating operation is performed (E90, Yes), the camera mode processing ends.

2-3. Functions and Advantageous Effects

In the smartphone 2, which is an example of electronic devices owned by a user, when the camera mode is activated, the processing section 100 performs the camera mode processing. In the camera mode processing, when the panoramic image generating mode is selected, a panoramic image, which is a wide-angle composite image, is generated based on the image generating principle described in the above embodiment and is displayed on the display section 300. Accordingly, the user can view the generated panoramic image on the smartphone 2.

3. Second Example

In the second example, the user makes the smartphone 2 regenerate a panoramic image when the panoramic image generated in the panoramic image generating mode has a discordance in the above-describe example of the smartphone 2.

3-1. Processing

Figure 22:
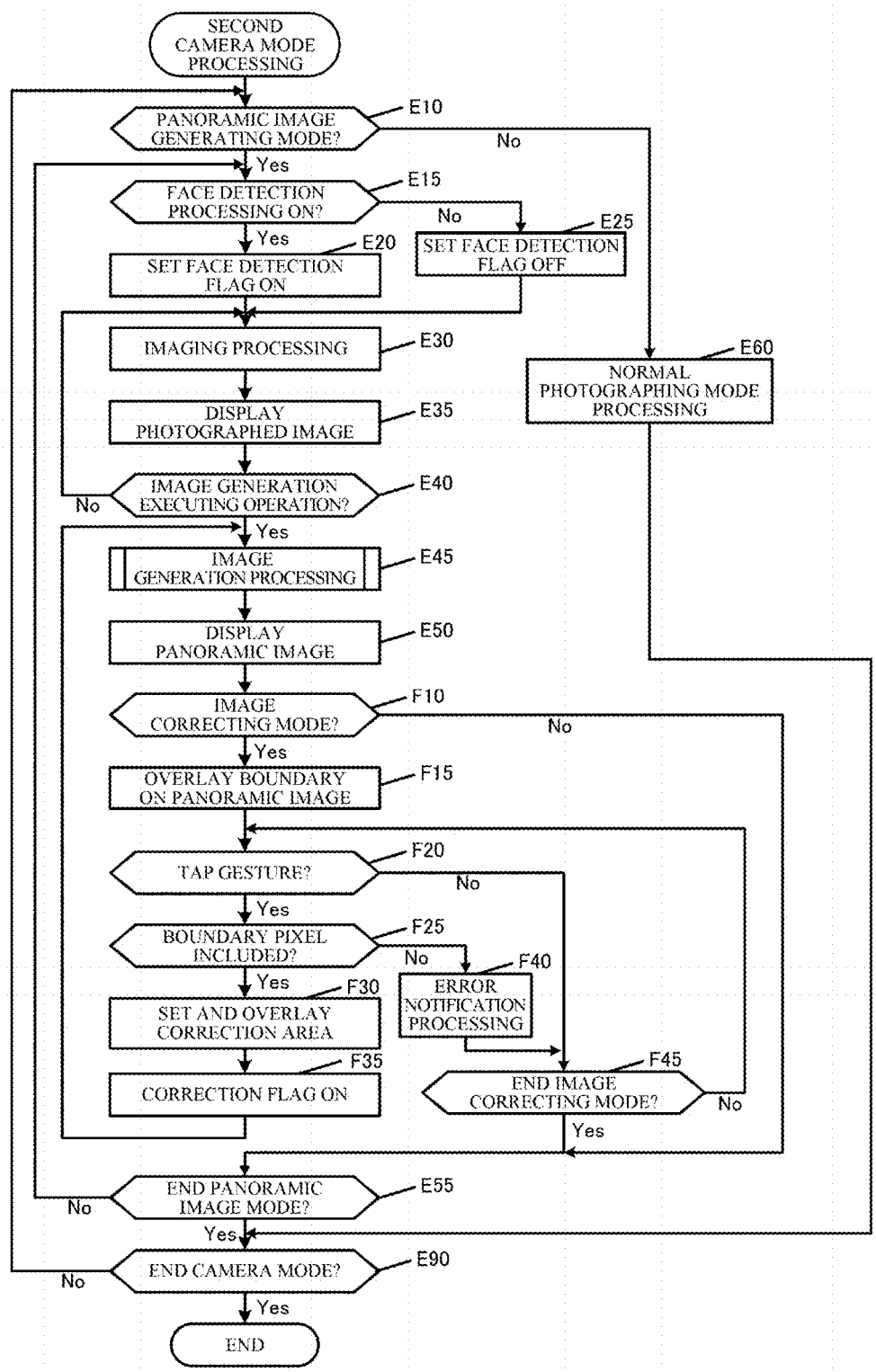
FIG. 22 is a flowchart illustrating an example of the flow of second camera mode processing.

FIG. 22 is a flowchart illustrating an example of the flow of a second camera mode processing, which is executed by the processing section 100 of the smartphone 2 in place of the camera mode processing of FIG. 21. The same reference signs denote the same steps as those of the camera mode processing, and repeated descriptions are omitted.

After the panoramic image is displayed on the display section 300 in E50, the processing section 100 makes a determination as to whether the user selects an image correcting mode for correcting the panoramic image (F10). If it is determined that the image correcting mode is selected (F10, Yes), the display control section 190 overlays the boundaries, which have been determined by the boundary determination processing in the image generation processing, on the panoramic image (F15) displayed on the display section 300. Since a plurality of input images are stitched together in order to generate the panoramic image, the boundary is formed between each pair of stitched input images, and one or more boundaries are displayed at the corresponding location on the panoramic image.

The panoramic image is a color image composed of a variety of color components. Further, in addition to the target subject, a variety of other objects (e.g. buildings, vehicles, roads, plants and the like) are shown in the panoramic image. Accordingly, when the boundary is drawn by a simple black line and overlaid on the panoramic image, it is sometimes difficult for the user to distinguish it.

To address the problem, in the composite image correcting mode, for example, the panoramic image to be displayed on the display section 300 is converted to a grayscale image, and the boundary overlaid on the grayscale panoramic image is drawn in a vivid color such as blue, green and red so that it is emphasized. In this way, the user can readily understand where the boundary is formed in the panoramic image.

Alternatively, when the boundary is overlaid on the color panoramic image, for example, the boundary may be drawn using a bold line of a specific color (e.g. white or black), or the boundary may be displayed in a blinking manner. That is, the only requirement is that the boundary is displayed in a manner for it to be clearly recognizable as a boundary by the user, and the display manner is not limited to the above-described manners.

Then, the processing section 100 makes a determination as to whether a tap gesture is performed on the touch panel 250 (F20). If a tap gesture is performed (F20, Yes), it further makes a determination as to whether a pixel of the boundary is included in the tapped spot (F25). If it is determined that a boundary pixel is included (F25, Yes), the processing section 100 sets a predetermined correction area that includes the tapped spot and overlays it on the panoramic image (F30).

Since the tap gesture is performed with a user finger, the tapped spot has a certain size. In this case, an area composed of all pixels constituting the tapped spot may be set as the correction area. Alternatively, an area with a predetermined shape (e.g. oval) that is smaller than the tapped spot but includes a boundary pixel may be set as the correction area.

Then, the processing section 100 sets a correction flag to "ON" (F35). Then, the process returns to E45 where the processing section 100 performs the image generation processing again. That is, the processing section 100 re-determines the boundary and regenerates the composite image based on the re-determined boundary. In the image generation processing of this process, a second boundary determination processing is performed in place of the boundary determination processing of FIG. 19.

Figure 23:
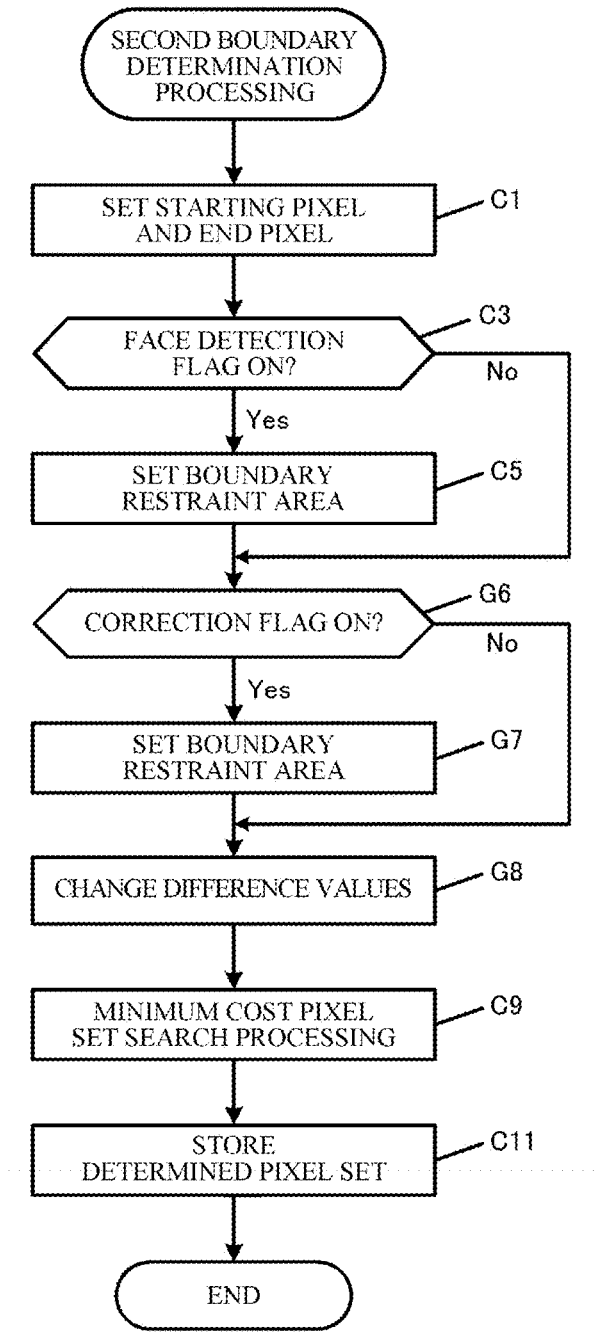
FIG. 23 is a flowchart illustrating an example of the flow of second boundary determination processing.

FIG. 23 is a flowchart illustrating an example of the flow of the second boundary determination processing. The same reference signs denote the same steps as those of the boundary determination processing, and repeated descriptions are omitted.

If it is determined in C3 that the face detection flag is "OFF" (C3, No), the boundary determining section 160 sets an area corresponding to the set correction area as a boundary restraint area in the difference image generated by the difference value calculating section (G7). Also, after C5, the boundary determining section 160 makes a determination as to whether the correction flag is "ON" (G6), and if it is determined that the flag is "ON" (G6, Yes), it sets the boundary restraint area similarly (G7).

Then, the boundary determining section 160 performs difference value correction processing to correct the difference values of the boundary restraint area set in G5 or G7 (G8). Then, the process proceeds to C9.

Returning to the second camera mode processing, if it is determined in F20 that the tap gesture is not performed (F20, No), the processing section 100 makes a determination as to whether the user performs the operation of terminating the image correcting mode (F45). If it is determined that the operation is not performed (F45, No), the process returns to F20. If it is determined that the operation of terminating the image correction mode is performed (F45, Yes), the process proceeds to E55.

Further, if it is determined in F25 that the tapped spot does not include a boundary pixel (F25, No), the processing section 100 performs error notification processing to notify the user of an error (F40). Specifically, a message that prompts the user to tap the boundary area is displayed on the display section 300. Then, the process proceeds to F45.

3-2. Display Screen

Figure 24:
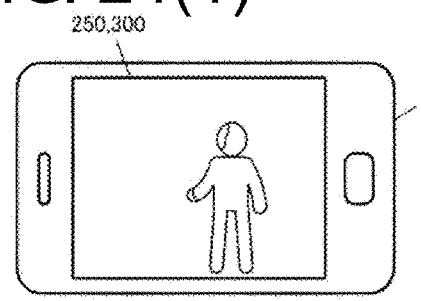
FIG. 24 (1) to FIG. 24 (6) illustrate an example of a panoramic image displayed on a display section of a smartphone.
Figure 24:
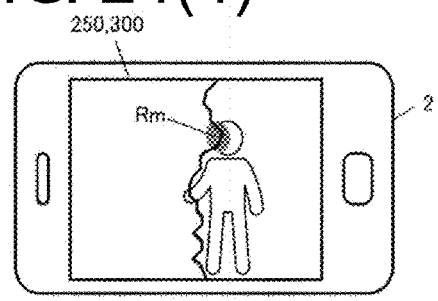
Figure 24:
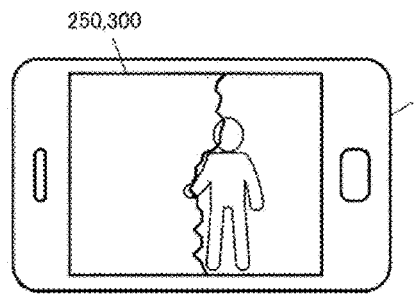
Figure 24:
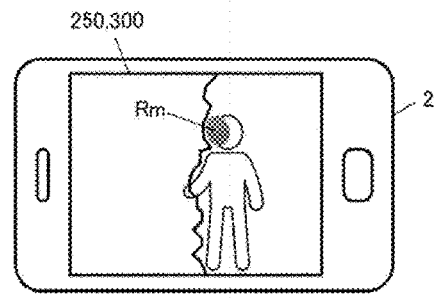
Figure 24:
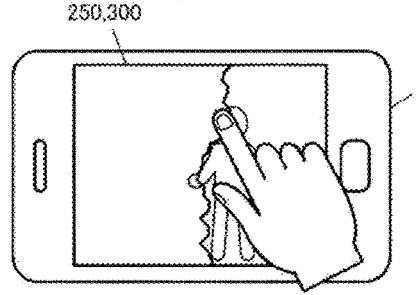
Figure 24:
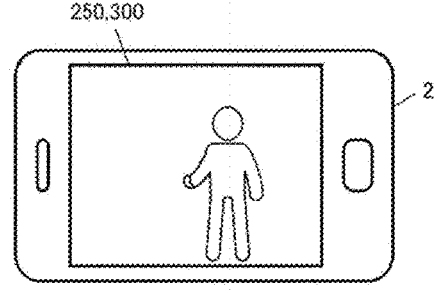

FIG. 24 (1) to FIG. 24 (6) illustrate an example of the screen displayed on the display section 300 of the smartphone 2 and the user operation in the second camera mode processing.

FIG. 24 (1) illustrates the state in which a panoramic image is displayed on the display section 300 of the smartphone 2 (E50). For ease of description, only one boundary is shown in the figure. In the image generation processing, since the user did not set the face detection processing to "ON" (E15, No, then E25), the boundary determination processing was performed without setting the boundary restraint area to the face of a person who was the target subject (E45). As a result, the image of the face of a person includes discordance due to the composition.

The user who has recognized the discordance turns the image correcting mode "ON" (F10, Yes). Then, as illustrated in FIG. 24 (2), the boundary is overlaid on the panoramic image of FIG. 24 (1) (F15). As illustrated in FIG. 24 (3), the user taps the part of the boundary that exists on the face with his/her finger (F20, Yes, then F25, Yes). As a result, for example, an oval correction area Rm including the tapped spot is set (F30), and the correction area Rm is overlaid on the panoramic image as illustrated in FIG. 24 (4) (F30).

In this step, as illustrated in FIG. 24 (5), the re-determined boundary may be displayed on the screen so that the user can check it. In FIG. 24 (5), the part of the boundary that exists on the person's face in FIG. 24 (2) has been moved out of the oval correction area Rm, and the user can intuitively understand from the displayed screen that the correction of the boundary suitably reflects the intent of the user. Alternatively, both boundaries before and after the correction may be displayed on the screen in a mutually distinguishable manner using different colors or lines or the like so that the user can check the difference between them. In this way, the user can understand how the original boundary has changed from the re-determined boundary, which improves usability.

Thereafter, in response to a user command operation of regenerating a panoramic image, the image generation processing is performed again (F35, then E45), and the composite image is regenerated using the re-determined boundary. Then, as illustrated in FIG. 24 (6), the regenerated composite image is displayed on the display section 300 as a panoramic image (E50). In the displayed panoramic image in FIG. 24 (6), the person's face, which was displayed with discordance in FIG. 24 (1) due to the composition, is suitably corrected.

4. Third Embodiment

In a third embodiment, when the user is to take an image in the above-described example of the smartphone 2, a predetermined caution is given when a human face is shown in the image of the standby imaging screen and the face is located in the margin of the screen. This caution is given because the following problems may occur when a face is located in the margin of the screen in photographing.

(1) The image quality is impaired.

(2) A face in the margin of the screen may not be detected by the face detection processing. If this happens, since the face cannot be set as the boundary restraint area by detecting it in the face detection processing, the boundary may be formed on the face and the face image may include discordance due to the composition.

(3) If none of the photographed images completely shows the whole face of a person located in the screen margin, there is no choice but to use the image data of the face on the screen edge for the subsequent processing. As a result, when the boundary is determined based on the result of face detection processing in the above-described image generation processing, the boundary may be formed on the face and the face image may include discordance as a result of the composition.

For these reasons, when it is determined that the user is going to take an image in a condition in which a face is located in the margin of the screen, it is required to take the image in a different condition in which the face is fully displayed or to take at least one other image that shows the whole face. Accordingly, before taking an image, the user is prompted to move the smartphone 2 (camera) or the face to a suitable position to take an image so that the face is away from the margin of the screen.

Figure 25:
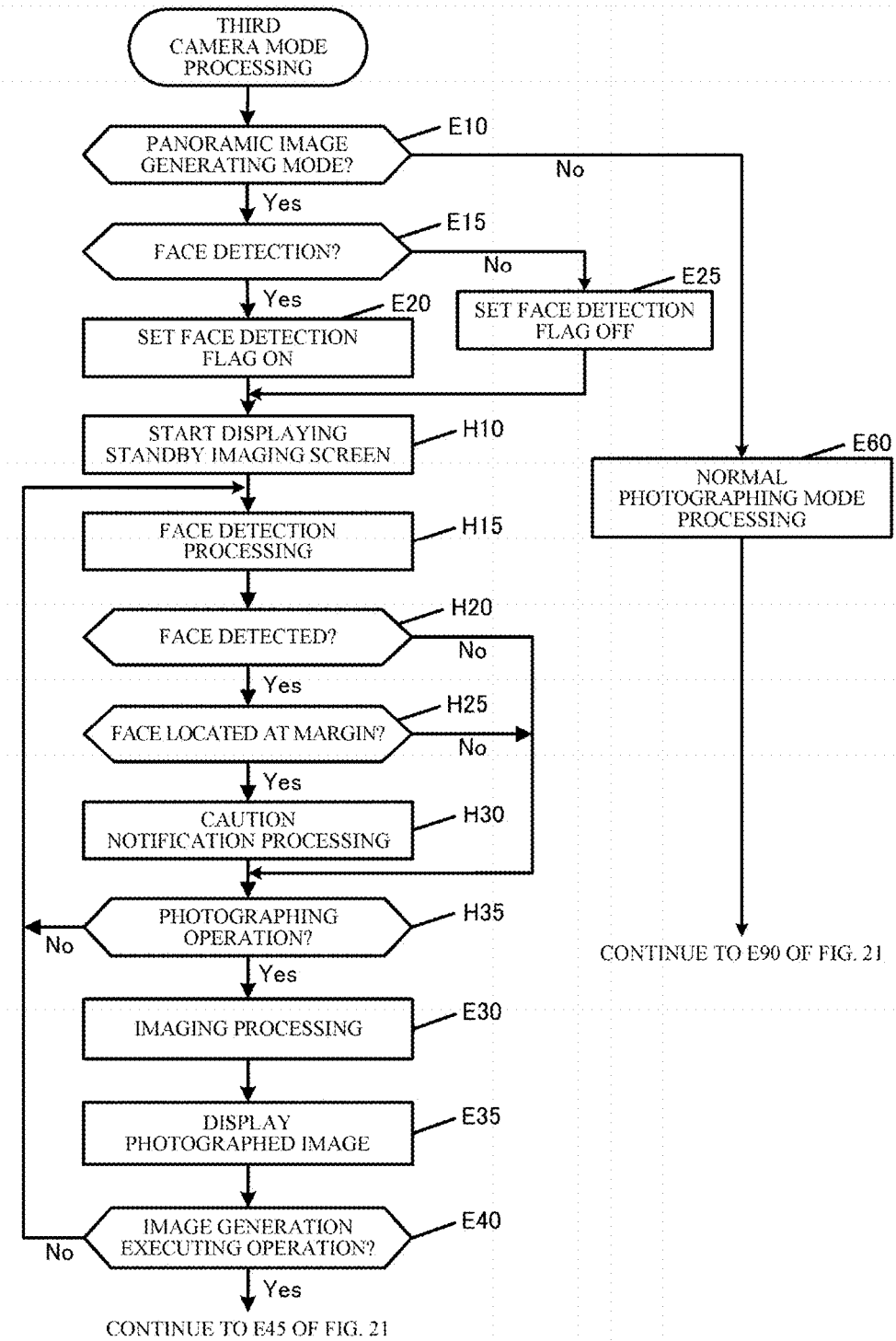
FIG. 25 is a flowchart illustrating an example of third camera mode processing.

FIG. 25 is a flowchart illustrating an example of the flow of a third camera mode processing that is performed by the processing section 100 of the smartphone 2 in place of the camera mode processing of FIG. 20. The same reference signs denote the same steps as those of the camera mode processing, and repeated descriptions are omitted.

After E20 or E25, the display control section 190 starts processing to display the standby imaging screen on the display section 300 (H10). Then, the processing section 100 performs the face detection processing to detect a human face from the image in the standby imaging screen (H15).

Then, the processing section 100 makes a determination as to whether a human face is detected in the face detection processing (H20). If it is determined that a human face is detected (H20, Yes), it further makes a determination as to whether the detected face is included in a predetermined marginal area of the screen (H25). Then, if it is determined that the detected face is included in the predetermined area (H25, Yes), the processing section 100 performs a caution notification processing (H30). The caution notification processing is to give a caution to the user that a human face is located in the margin of the screen in the standby imaging screen.

Specifically, for example, a message that prompts the user to adjust the position of the smartphone 2 (camera) or the face so that the face is away from the margin of the screen, a message that prompts the user to move the face to the center part of the screen or a message that prompts the user to take at least one image in which the face is not located in the margin is displayed in the standby imaging screen on the display section 300.

One or more of the above-described messages may be displayed. That is, at least one of the following notifications may be given as the caution: (1) a notification that prompts the user to adjust the position of the device or the face so that the face is away from the margin of the screen, (2) a notification that prompts the user to move the face toward the center of the screen and (3) a notification that prompts the user to take at least one image in which the face is not located in the margin.

In order to allow the user to check the above-described messages, they may be displayed as a pop-up over the standby imaging screen, or the standby imaging screen is temporarily hidden and switched to another screen to display them.

Further, as the caution notification, a voice massage similar to the above-described visual messages may be output from the sound output section 400. That is, in the example, the display section 300 and/or the sound output section 400 can serve as a means of notification for giving a caution.

If it is determined in H20 that a human face is not detected (H20, No), or if it is determined in H25 that the detected face is not included in the predetermined marginal area of the screen (H25, No), the process proceeds to H35.

After H30, the processing section 100 makes a determination as to whether the user performs a photographing operation (H35). If it is determined that the operation is performed (H35, Yes), the process proceeds to the steps from E30 to E40. In E40, if it is determined that the user does not performs an image composition execution operation (E40, No), the process returns to H15.

5. Variations

The examples to which the present disclosure is applicable are not limited to the above-described examples, and it should be understood that suitable changes may be made without departing from the spirit of the present disclosure. Hereinafter, variations will be described. In the following description, the same reference signs denote the same components as those of the above-described examples, and repeated descriptions are omitted.

5-1. Electronic Devices

The image generating device 1 may be installed in electronic devices such as smartphones, cameras, digital cameras, tablets, PDAs and personal computers. The image generating device 1 of the present disclosure may be installed in a variety of devices that have an imaging section.

According to a user operation, the same image as the composite image displayed on the display section 300 of the smartphone 2 may also be displayed on a display section of another electronic device (information processing device). Specifically, for example, a communication connection is made between the smartphone 2 in his/her hand and a personal computer. Then, the user transfers the composite image displayed on the display section 300 of the smartphone 2 to the personal computer. The personal computer displays the composite image transferred from the smartphone 2 on its display, and the user views the composite image on the display of the personal computer.

In such a configuration, the image data of a series of photographed images captured by the smartphone 2 may be sent to the personal computer, and the personal computer may generate the composite image instead of the smartphone 2 and display the image on its display. In this case, the combination of the smartphone and the personal computer serves as the image generating device 1 of the present disclosure.

5-2. Pixel Area

In the above-described embodiment, the difference values are calculated on a pixel basis, and these difference values on a pixel basis are used for the separation processing (e.g. the minimum cost pixel set search processing) to determine the boundary. However, it is not essential to use such difference values calculated on a pixel basis, but the difference values may be calculated for each image area composed of two or more pixels, and these difference values on an image area basis may be used for the separation processing to determine the boundary. For example, the pixel set of an image may be divided into grid areas, and a similar processing as in the above-described embodiment is performed on these areas as the pixel areas in order to determine the boundary.

In this case, for example, each pixel area may be a square of 10×10 pixels, 20×20 pixels or the like or a rectangle of 10×20 pixels, 20×10 pixels or the like.

The size of the pixel areas may be suitably changed according to the size of the input images. For example, the size of the pixel areas may be selected within the range of 1% to 10% of the size of the input images, and the processing may be performed with respect to each pixel area.

5-3. Relative Value

In the above-described embodiment, the difference values of pixel values are calculated as the relative values that represent the relative relationship between the reference image and the target image. Instead, the ratios of pixel values may be calculated as the relative values. In this case, the boundary may be determined in a similar manner as the above-described embodiment based on the ratios of pixel values, which are obtained as the relative values.

5-4. Separation Processing

5-4-1. Separation Processing by Graph Cut

In the above-described embodiment, the minimum cost pixel set search processing is performed as the separation processing to determine the boundary. Instead, a graph cut (hereinafter referred to as graph cut processing) may be performed as the separation processing to determine the boundary. A graph cut is a technique of dividing the vertices of a graph into two subsets. In the field of image processing, a graph cut is used for extracting a specific area from an input image, separating an input image into a foreground area and a background area, or the like.

Specifically, a directed graph G=(V, E) is firstly defined. V is nodes (node set), and E is edges (edge set). Further, from among the nodes V, a source s where a flow starts and a sink t where the flow ends are set. Weights are set to the edges E, which are called costs. An s-t cut (minimum cut) that minimizes the cut size, which is the sum of the edge costs of a path from the source s to the sink s, is determined.

When the graph cut processing is used for determining the boundary of the present disclosure, the pixels of the difference image between the reference image and the target image correspond to the nodes V, and the lines connecting adjacent pixels correspond to the edges E. Further, the source s and the sink t are set in an area where the reference image and the target image do not overlap with each other. Specifically, the source s is set in an image area where the image can be rendered based on the reference image but cannot be rendered based on the target image, and the sink s is set in an image area where the image can be rendered based on the target image but cannot be rendered based on the reference image. Unspecified nodes V are set in an image area where the image can be rendered based on both of the reference image and the target image. A cost is set to each edge E based on the pixel values of the adjacent nodes V.

By using the cut size as the evaluation value, an s-t cut that gives the minimum cut size is determined, for example, by a maximum flow-minimum cut algorithm, so that the difference image is divided into two areas. Then, a set of pixels that is located on the border of these two divided areas is determined as the boundary.

5-4-2. Separation Processing by Target Subject Detection

Alternatively, as the separation processing, target subject detection processing may be performed to detect the target subject from the input image, and the boundary may be determined by using the difference image and the processing result of the target subject detection processing.

Specifically, face detection processing for detecting a human face from the input images or body detection processing for detecting a human body part (e.g. hand, leg or body) is performed as the target subject detection processing. Then, an image area in the difference image that excludes an image area of a human face or body detected by the face detection processing or the body detection processing is set as a boundary forming area, and the boundary is formed in the boundary forming area.

For example, the above-described minimum cost pixel set search processing or graph cut processing may be performed in the boundary forming area to determine the boundary. Alternatively, matching processing may be performed in the boundary restraint area to determine the boundary, in which the boundary is matched to a boundary pattern approximated by a straight or curved line (e.g. quadratic curve).

The target subject to be detected by the target subject detection processing may be either human or animal. Further, a variety of objects present in the photographic scene, (e.g. buildings and vehicles) may be detected as the target subject.

5-5. Boundary Restraint Area

In the above-described embodiment, the face detection processing is performed to detect a human face, which is an example of object detection processing, and an area including the detected human face is set as the boundary restraint area for determining the boundary. However, the object to be detected is not limited to human faces. The face detection processing may be to detect the face of an animal, and an area including the detected face of an animal may be set as the boundary restraint area for determining the boundary. Further, the object to be detected is not limited to faces. Body detection processing may be performed to detect a human or animal body part (e.g. hand, leg or body), and an area including the detected body part is set as the boundary restraint area for determining the boundary.

Further, as such object detection processing, a variety of objects present in a photographic scene (e.g. buildings and vehicles) may be detected, and an area including the detected object may be set as the boundary restraint area for determining the boundary.

In the example of the smartphone 2, the device may be configured such that the user can perform a paint operation on the touch panel 250 with his/her finger, and the area painted by the user may be set as the boundary restraint area for determining the boundary.

5-6. Recording Medium

In the above-described embodiments, the programs and data relating to the image generation are stored in the memory section of the image generating device 1 and the memory section 800 of the smartphone 2, and the processing section reads out and executes these programs so as to perform the image processing of the above-described embodiment. In this case, the memory section of each device may include a recording medium (external storage) such as a memory card (SD card), a COMPACT FLASH (registered trademark), a memory stick, a USB memory, a CD-RW (optical disk) and an MO (magnetooptic disk) in addition to an internal storage such as a ROM, an EEPROM, a flash memory, a hard disk and a RAM, and the above-described programs and data may be stored in the recording medium.

Figure 26:
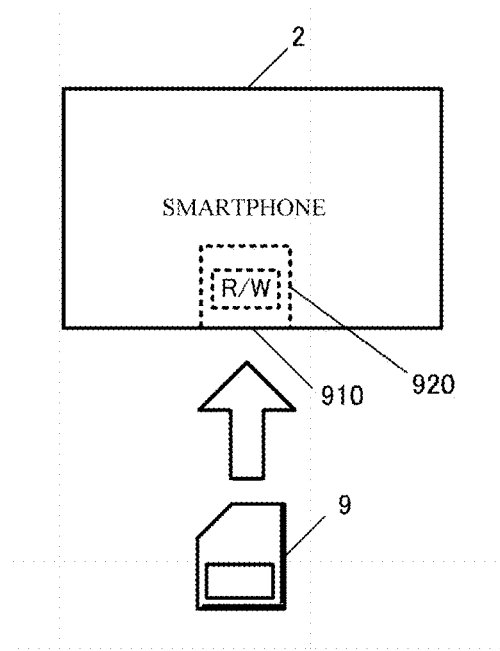
FIG. 26 illustrates an example of a recording medium.

FIG. 26 illustrates an example of the recording medium in this case.

The smartphone 2 includes a card slot 910 to which a memory card 9 is inserted and a card reader/writer (R/W) 920 to read/write information from/to a memory card 9 inserted in the card slot 910. The card reader/writer 920 writes the programs and data stored in the memory section 800 to the memory card 9 by a control of the processing section 100. Further, the programs and data stored in the memory card 9 are configured so that they can be read by external devices (e.g. personal computers) including the smartphone 2 in order to generate a composite image as described in the above-described embodiment.

What is claimed is:

1. An electronic device, comprising
a boundary determining unit for determining a boundary for compositing a first input image and a second input image;
an image compositing unit that composites the first input image and the second input image based on the boundary determined by the boundary determination unit to generate the composite image;
a restraint unit for restricting the boundary from being formed in a predetermined boundary restraint area;
an operating unit;
a display unit;
a display control unit for causing the display unit to display the composite image generated by the image compositing unit;
a boundary changing unit capable of changing the boundary determined by the boundary determining unit; and
an image re-compositing unit for re-compositing the composite image compositing the first input image and the second input image based on the boundary changed by the boundary changing unit,
wherein the boundary changing unit makes it possible to changes the boundary restraint area and the boundary based on a specified area when the boundary is included in the specified area specified by a user operation on the operating unit,
when the boundary is not included in the specified area specified by the user operation on the operating unit, the display control unit causes the display unit to display a predetermined error notification to notify the user of an error.

2. The electronic device of claim 1, wherein
when the boundary is included in the specified area specified by the user operation on the operating unit, the display control unit superimposes and displays the specified area on the composite image.

3. The electronic device of claim 2, wherein
the display control unit causes the display unit to display both the boundary before being changed by the boundary changing unit and the boundary after being changed by the boundary changing unit in a mutually distinguishable manner.

4. An image generation method for generating a composite image by stitching input images, comprising:
determining a boundary for compositing a first input image and a second input image;
compositing the first input image and the second input image based on the determined boundary to generate the composite image;
restricting the boundary from being formed in a predetermined boundary restraint area;
displaying the generated composite image;
changing the determined boundary; and
re-compositing the composite image compositing the first input image and the second input image based on the changed boundary,
wherein the boundary restraint area and the boundary are possible to be changed based on a specified area when the boundary is included in the specified area specified by a user operation, and the image generation method further comprises:
displaying a predetermined error notification to notify the user of an error when the boundary is not included in the specified area specified by the user operation.

5. The image generation method of claim 4, further comprising:
superimposing and displaying the specified area on the composite image when the boundary is included in the specified area specified by the user operation.

* * * * *